United States Patent
Beiler et al.

(10) Patent No.: US 11,530,008 B2
(45) Date of Patent: Dec. 20, 2022

(54) SELF-PROPELLED TANDEM AXLE TRAILER

(71) Applicant: New Heights, LLC, Leola, PA (US)

(72) Inventors: Aaron Jay Beiler, Gap, PA (US); William Fisher, Paradise, PA (US); Raymond Beiler, New Holland, PA (US); Jeremiah Weaver, Narvon, PA (US)

(73) Assignee: New Heights LLC, Leola, PA (US)

( * ) Notice: Subject to any disclaimer, the term of this patent is extended or adjusted under 35 U.S.C. 154(b) by 134 days.

(21) Appl. No.: 17/024,837

(22) Filed: Sep. 18, 2020

(65) Prior Publication Data

US 2021/0001938 A1 Jan. 7, 2021

Related U.S. Application Data

(63) Continuation-in-part of application No. 16/599,820, filed on Oct. 11, 2019.
(Continued)

(51) Int. Cl.
*B62D 59/04* (2006.01)
*B60K 17/34* (2006.01)
(Continued)

(52) U.S. Cl.
CPC ............ *B62D 59/04* (2013.01); *B60G 11/185* (2013.01); *B60K 17/358* (2013.01); *B60P 1/44* (2013.01);
(Continued)

(58) Field of Classification Search
CPC ........ B62D 59/04; B62D 13/00; B62D 63/06; B62D 13/04; B62D 53/068; B62D 61/125;
(Continued)

(56) References Cited

U.S. PATENT DOCUMENTS 1,694,267 A * 12/1928 King ...................... B62D 13/04
280/99
2,069,928 A * 2/1937 Runyan .................. B62D 13/00
280/426
(Continued)

FOREIGN PATENT DOCUMENTS

CA 2673840 A1 * 2/2010 ............... B60G 3/14
CN 101638052 A * 2/2010 ........... B60K 17/356
(Continued)

OTHER PUBLICATIONS

PCT International Search Report and Written Opinion, Application No. PCT/US2021/050904, dated Jan. 12, 2022, 13 pages.
(Continued)

*Primary Examiner* — Paul N Dickson
*Assistant Examiner* — Matthew D Lee
(74) *Attorney, Agent, or Firm* — Barley Snyder

(57) ABSTRACT

A trailer for towing by a power vehicle is provided and generally includes a frame and a tandem wheel assembly. The frame forms an undercarriage chassis which the tandem wheel assembly is positioned there under. The undercarriage chassis includes a steerable rear wheel assembly, a steerable front wheel assembly, and an extension assembly moving the front wheel assembly between trailing position and a self-propelled position where the rear wheel assembly and the front wheel assembly are positioned to equally support the undercarriage chassis.

19 Claims, 18 Drawing Sheets

A

Related U.S. Application Data

(60) Provisional application No. 62/744,901, filed on Oct. 12, 2018.

(51) Int. Cl.
  *B60G 11/18* (2006.01)
  *B62D 7/14* (2006.01)
  *B66F 7/08* (2006.01)
  *B60P 1/44* (2006.01)
  *B60K 17/356* (2006.01)

(52) U.S. Cl.
  CPC ............ *B62D 7/142* (2013.01); *B66F 7/08* (2013.01); *B60G 11/183* (2013.01); *B60G 2202/134* (2013.01); *B60G 2202/1362* (2013.01); *B60K 17/356* (2013.01)

(58) Field of Classification Search
  CPC ........ B60P 1/02; B66F 9/0655; B60K 17/354; B60K 17/358; B60K 2007/0061; B60K 2007/0092; B60Y 2200/147; B60Y 2200/49; B60Y 2200/43
  USPC ...................................................... 280/149.2
  See application file for complete search history.

(56) References Cited

U.S. PATENT DOCUMENTS

| | | | |
|---|---|---|---|
| 2,818,275 A * | 12/1957 | Hollowell | B62D 13/04 280/7 |
| 4,185,713 A | 1/1980 | Williams et al. | |
| 4,314,709 A * | 2/1982 | Silbernagel | B62D 61/125 280/81.6 |
| 4,588,322 A | 5/1986 | Shoemaker et al. | |
| 4,865,341 A * | 9/1989 | Hicks | B62D 53/068 414/475 |
| 5,261,801 A | 11/1993 | Stone | |
| 6,312,238 B1 | 11/2001 | Gerlach | |
| 6,422,369 B1 | 7/2002 | McCalla | |
| 6,817,677 B1 * | 11/2004 | Beiler | B65F 3/26 298/22 C |
| 8,292,776 B1 | 10/2012 | Higman et al. | |
| 8,795,130 B2 | 8/2014 | Forrest | |
| 9,004,519 B1 * | 4/2015 | Beech | B62D 13/06 280/442 |
| 9,010,876 B2 | 4/2015 | Stelter et al. | |
| 9,840,277 B1 * | 12/2017 | Beech | B60D 1/62 |
| 2002/0070065 A1 | 6/2002 | Bracke et al. | |
| 2002/0112934 A1 | 8/2002 | Karambelas et al. | |
| 2002/0125060 A1 | 9/2002 | Cigal | |
| 2004/0200648 A1 | 10/2004 | Tarasinski et al. | |
| 2007/0163253 A1 | 7/2007 | Sakakura et al. | |
| 2009/0197730 A1 | 8/2009 | Berhan | |
| 2011/0197575 A1 | 8/2011 | Prigent et al. | |
| 2012/0068426 A1 * | 3/2012 | Olsen | B60D 1/36 362/543 |
| 2012/0187747 A1 | 7/2012 | Dagh et al. | |
| 2012/0240724 A1 | 9/2012 | Welschof et al. | |
| 2013/0160436 A1 | 6/2013 | Scheibel | |
| 2015/0096822 A1 | 4/2015 | Sato et al. | |
| 2015/0283892 A1 | 10/2015 | Larsson et al. | |
| 2016/0167558 A1 * | 6/2016 | Beiler | B60P 1/32 414/483 |
| 2018/0043811 A1 * | 2/2018 | Beiler | B62D 51/04 |
| 2018/0290581 A1 * | 10/2018 | Derstine | B66F 7/00 |
| 2020/0114993 A1 | 4/2020 | Beiler et al. | |

FOREIGN PATENT DOCUMENTS

| | | |
|---|---|---|
| EP | 3354506 A2 | 1/2018 |
| EP | 3381773 A1 | 10/2018 |
| FR | 1309984 A | 3/1963 |
| FR | 2409162 A1 | 6/1979 |

OTHER PUBLICATIONS

Extended European Search Report, Application No. 20186901.3-1012, dated Oct. 16, 2020, 9 pages.
Extended European Search Report, Application No. 18150656.9-1012/3354506, dated Oct. 5, 2018, 11 pages.

\* cited by examiner

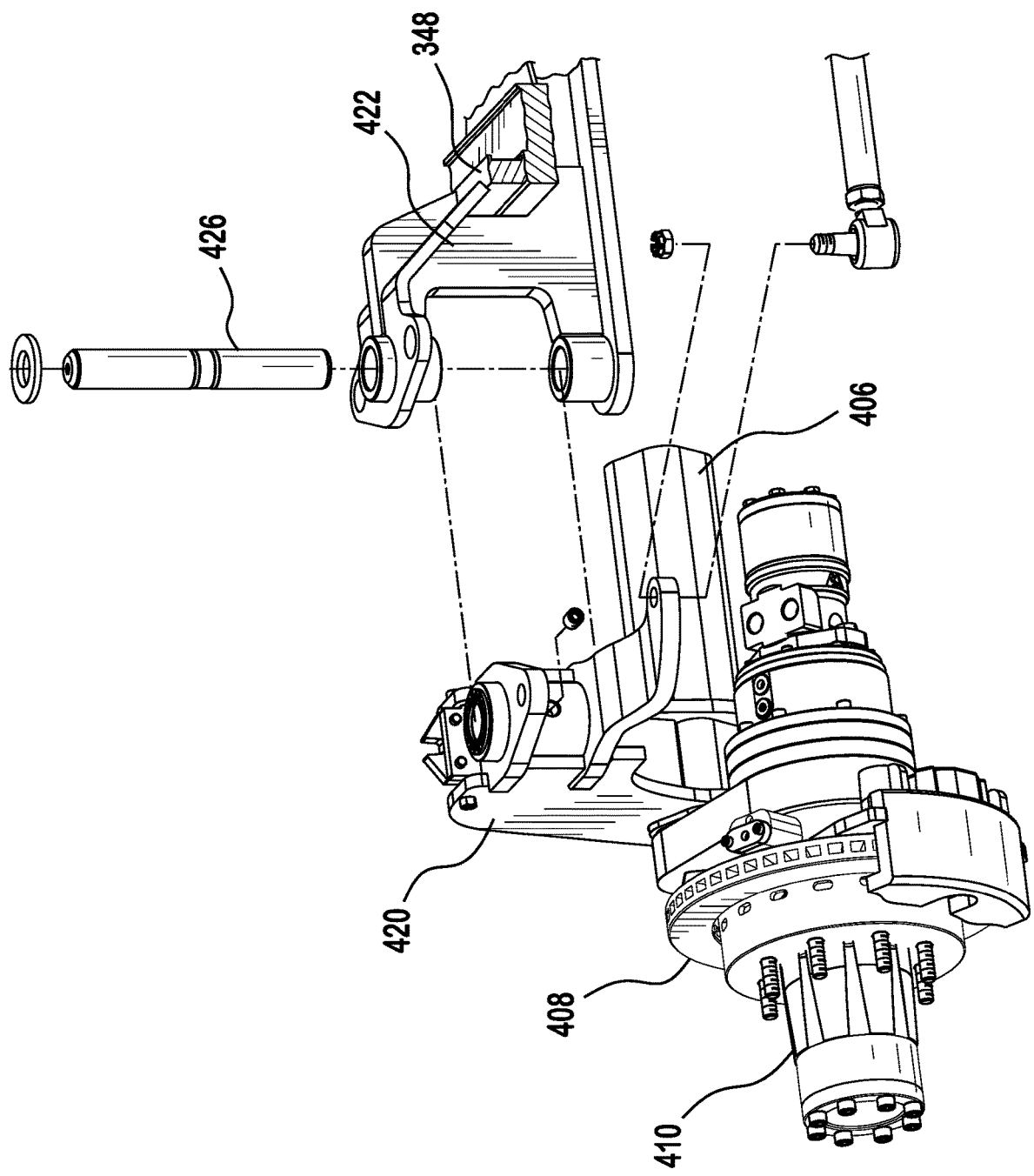

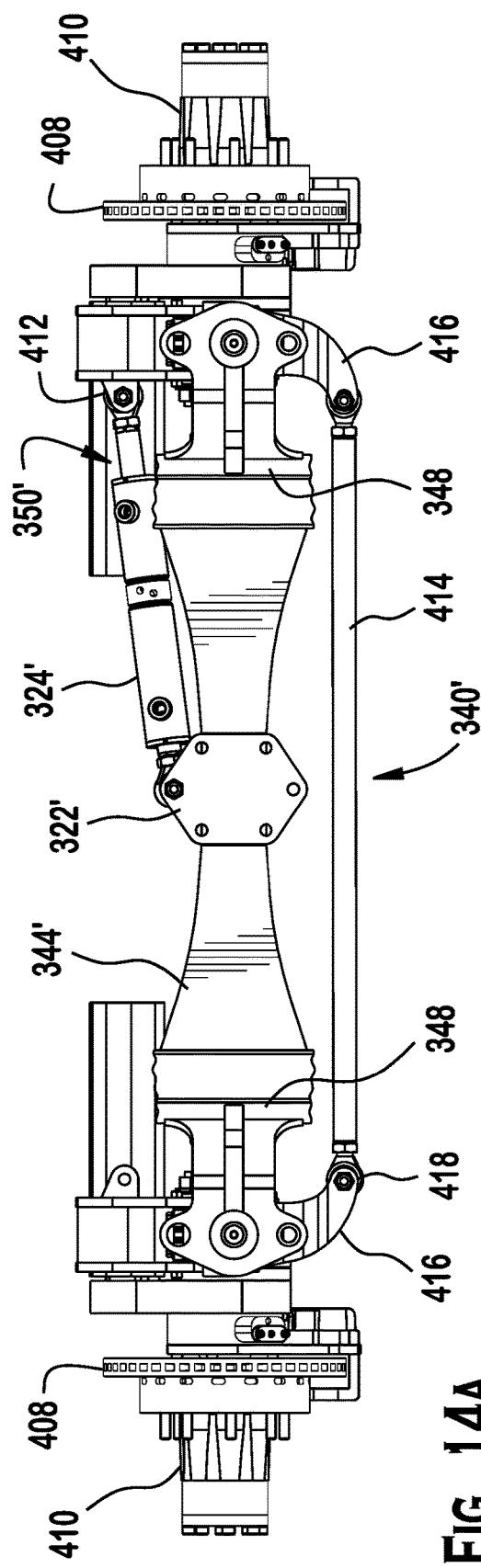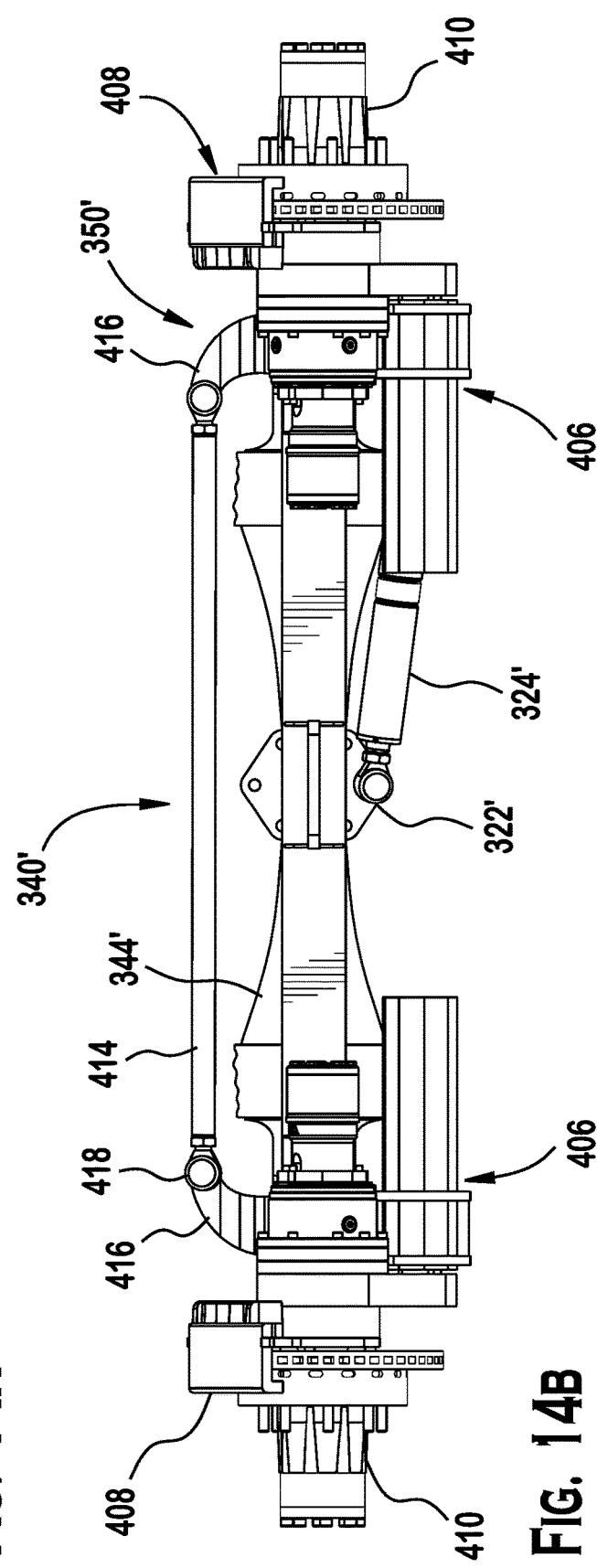
FIG. 14A
FIG. 14B

SELF-PROPELLED TANDEM AXLE TRAILER

CROSS-REFERENCE TO RELATED APPLICATION

This application is a continuation-in-part of Ser. No. 16/599,820 filed on Oct. 11, 2019, which claims the benefit of the filing date of Provisional Patent Application No. 62/744,901, filed on Oct. 12, 2018.

FIELD OF THE INVENTION

The invention relates to a self-propelled tandem axle trailer and, more particularly, to a self-propelled tandem axle trailer having a rear extending storage bin and a movable front axle.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around the typical landscaped yard surrounding a building and position a storage bin into an extended position near workers and that is study enough to handle large loads.

SUMMARY

In view of the foregoing, a trailer for towing by a power vehicle is provided and generally includes a frame and a tandem wheel assembly. The frame forms an undercarriage chassis which the tandem wheel assembly is positioned there under. The undercarriage chassis includes a rear wheel assembly, a front wheel assembly, and an extension assembly moving the front wheel assembly between trailing position and a self-propelled position where the rear wheel assembly and the front wheel assembly are positioned to equally support the undercarriage chassis.

In an exemplary embodiment, there is provided a trailer for towing by a power vehicle, having a frame forming an undercarriage chassis with a tandem wheel assembly positioned under the undercarriage chassis and having: a rear wheel assembly including a rear wheel assembly frame, a rear steering assembly and first and second rear hub assemblies; a front wheel assembly including a front wheel assembly frame, a front steering assembly and first and second front hub assemblies, and the trailer further having an extension assembly for moving the front wheel assembly between trailing position and a self-propelled position where the rear wheel assembly and the front wheel assembly are positioned to equally support the undercarriage chassis.

In an exemplary embodiment, the rear steering assembly comprises a rear steering arm affixed at a first end to a rear steering bracket on the rear wheel assembly frame, and at a second end to a steering arm mount of a first rear hub assembly.

In an exemplary embodiment, the first rear hub assembly is mechanically connected to a second rear hub assembly by a rear tie rod extended between the first and second rear hub assemblies, such that the first and second rear hub assemblies are configured to remain substantially parallel as the first rear hub assembly is turned. Furthermore, in an embodiment, the rear tie rod may have a ball joint at each end, such as may be beneficial to compensate for vertical travel of suspension components.

In an exemplary embodiment, the front steering assembly has a front steering arm affixed at a first end to a front steering bracket on the front wheel assembly frame, and at a second end to a steering arm mount of a first front hub assembly.

In an exemplary embodiment, the first front hub assembly is mechanically connected to a second front hub assembly by a front tie rod extended between the first and second front hub assemblies, such that the first and second front hub assemblies are configured to remain substantially parallel as the first hub assembly is turned. Furthermore, in an embodiment, the front tie rod may have a ball joint at each end, such as may be beneficial to compensate for vertical travel of suspension components.

In an exemplary embodiment, the frame includes a plurality of support beams positioned and secured apart by a plurality of connecting beams, a front support, a rear support. The front support may include a trailer connection section with a trailer hitch positioned on a leading end of the frame. Additionally, each support beam of the plurality of support beams may include a support rail. The support rail may be positioned on a lower end and running along a length of the support beam.

In an exemplary embodiment, the first and second rear hub assemblies of the rear wheel assembly and the first and second front hub assemblies of the front wheel assembly each provide at least one of a drive assembly, suspension assembly, and brake assembly.

In an exemplary embodiment, at least one of the suspension assemblies is a torsion suspension system, having an exterior housing pivotably affixed to the respective wheel assembly frame, a torsion rod contained within the exterior housing, and at least one resiliently deformable element suspending the torsion rod within the exterior housing, and a torsion arm extended between the torsion rod and the hub assembly.

In an exemplary embodiment, the front wheel frame includes a body with a pair of low friction guides positioned at opposite side ends thereof and corresponding to the support rail of each of the plurality of support beams. Each of the low friction guides of the pair of low friction guides may be a u-shaped member, and having low frictions pads to provide a low friction coefficient between the front wheel frame and the support rail.

In an exemplary embodiment, the trailer has a storage bin and an extension device connected to the frame and the storage bin to move the storage bin away from the frame.

The storage bin may include a platform extending substantially parallel with the frame. The extension device may include a first extension section rotatably connected the frame, and a second extension section rotatably connected to the first extension section, and a storage bin platform section connected to the second extension section. The second extension section may be expandable and include a boom support, a sliding support received by the boom support, a sliding mechanism moving the sliding support relative to the boom support. Furthermore, the second extension section may further include an upper lifting actuator assembly connected to the frame and the boom support to extend and move the boom support relative to the frame.

BRIEF DESCRIPTION OF THE DRAWINGS

The invention is explained in greater detail below with reference to embodiments and the appended drawings of which:

FIG. 13 is a partially exploded view of the mounting of a wheel hub assembly to the wheel assembly frame;

FIG. 14A is a top view of an alternative embodiment of a wheel assembly of the self-propelled tandem axle trailer according to the invention;

FIG. 14B is a bottom view of an alternative embodiment of a wheel assembly of the self-propelled tandem axle trailer according to the invention;

DETAILED DESCRIPTION OF THE EMBODIMENT(S)

Figure 1:
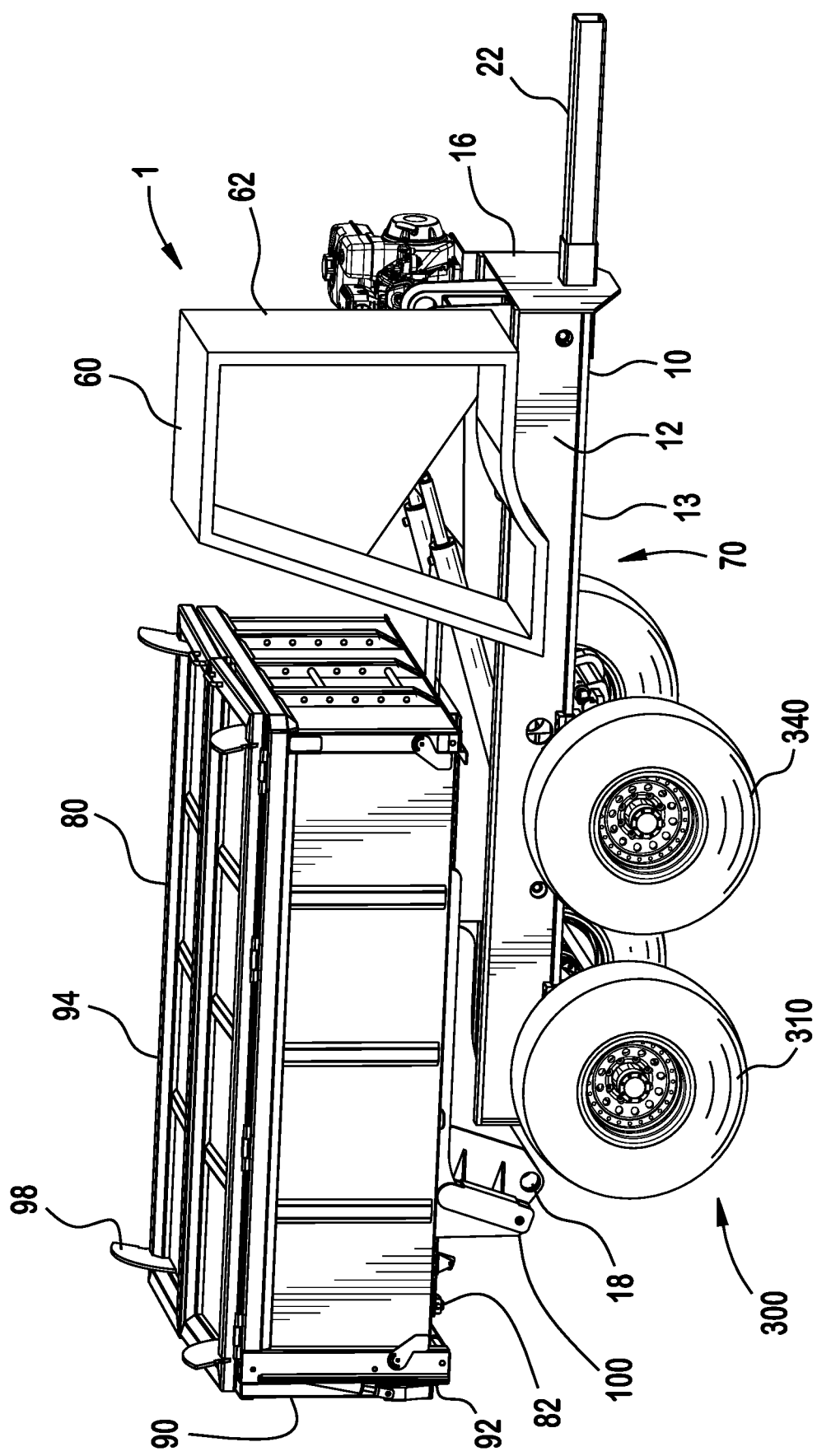
FIG. 1 is a front perspective view of a self-propelled tandem axle trailer according to the invention.

With respect to FIGS. 1-6, a trailer 1 according to the invention is shown and ready for towing by a power vehicle, such as a truck with a tow hitch. The trailer 1 generally includes the following major components: a frame 10, a control system 60, a storage bin 80, and an extension device 100, and a tandem wheel assembly 300.

Now with reference to FIGS. 1-4, the frame 10 will be discussed. In the shown embodiment, the frame 10 includes a plurality of support beams 12, a plurality of connecting beams 14, a front support 16, a rear support 18, a trailer connection section 22.

Figure 2:
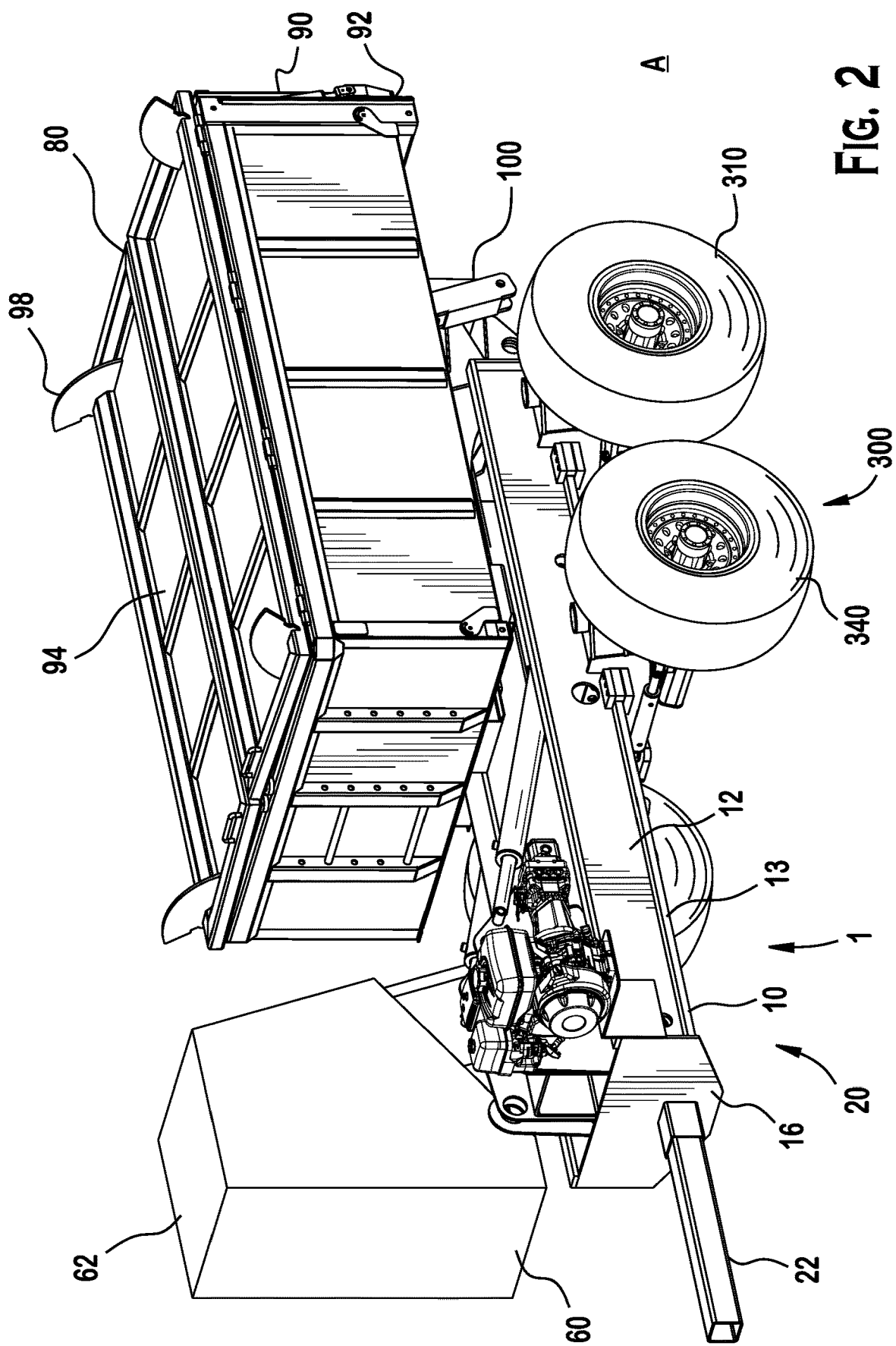
FIG. 2 is rear perspective view of the self-propelled tandem axle trailer of FIG. 1.
Figure 3:
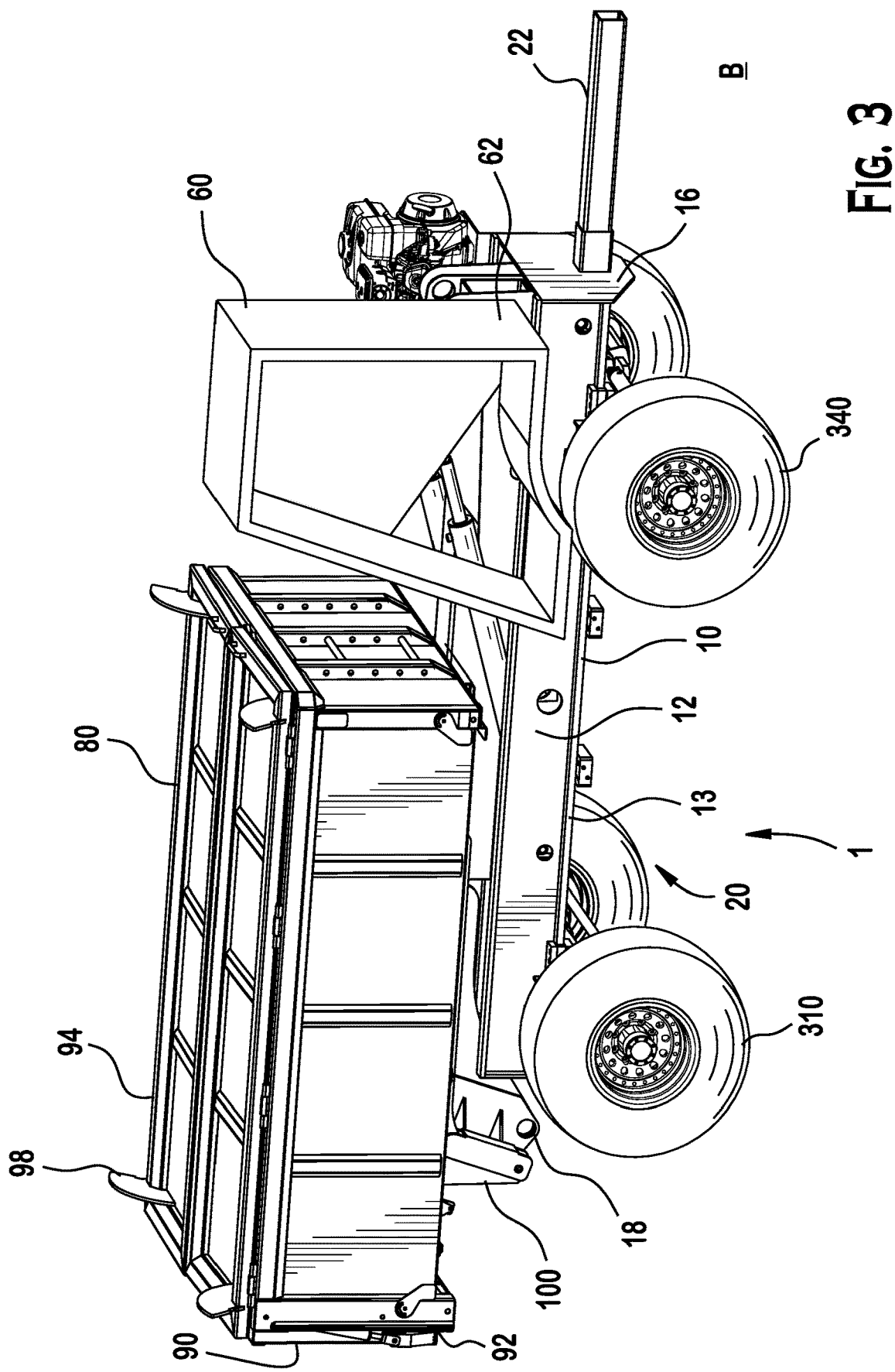
FIG. 3 is perspective view of a self-propelled tandem axle trailer according to the invention, showing extension of a front axle to a drivable position.
Figure 4:
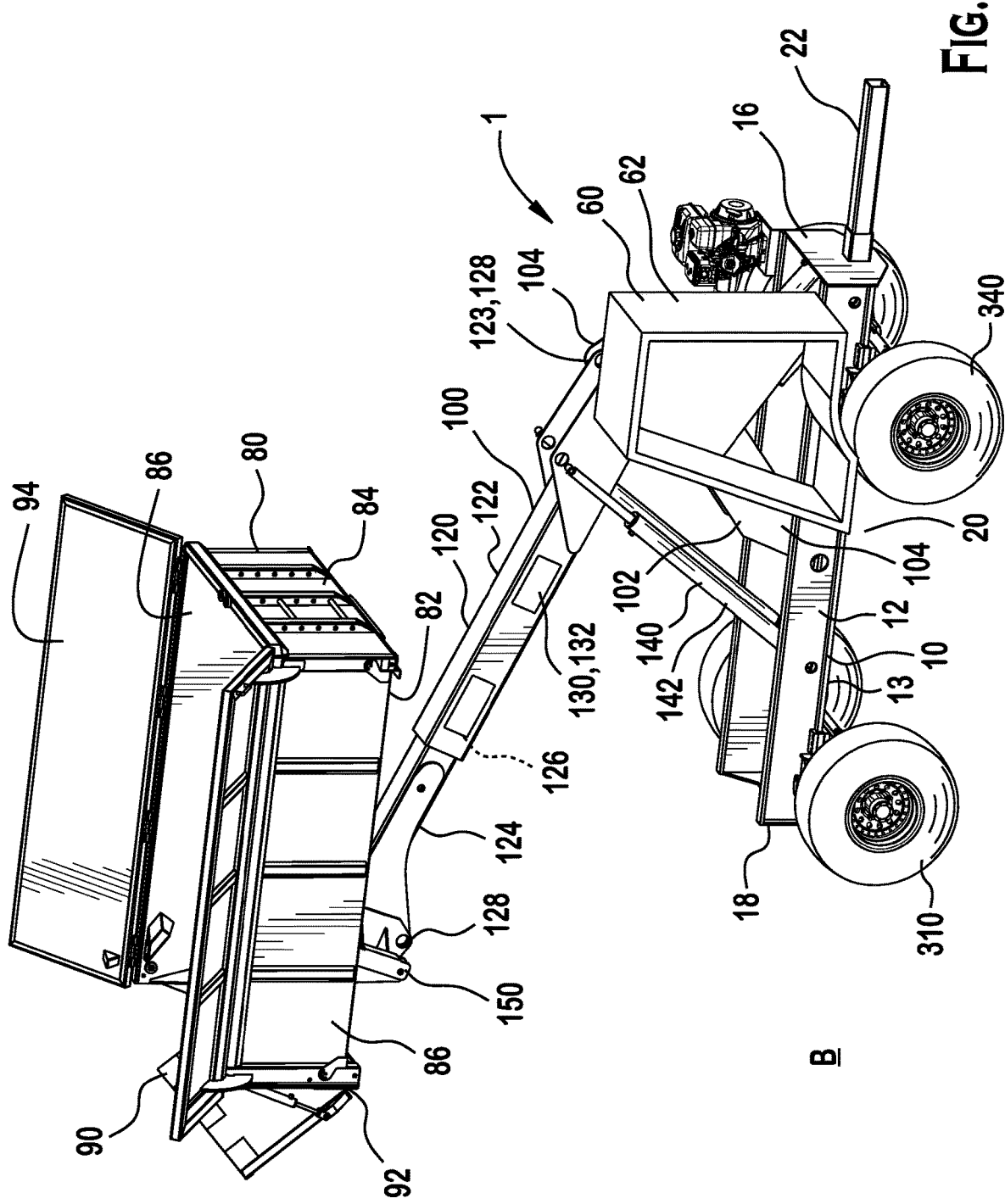
FIG. 4 is another perspective view of the trailer of FIG. 3, showing extension and inclination of a storage bin thereof.
Figure 5:
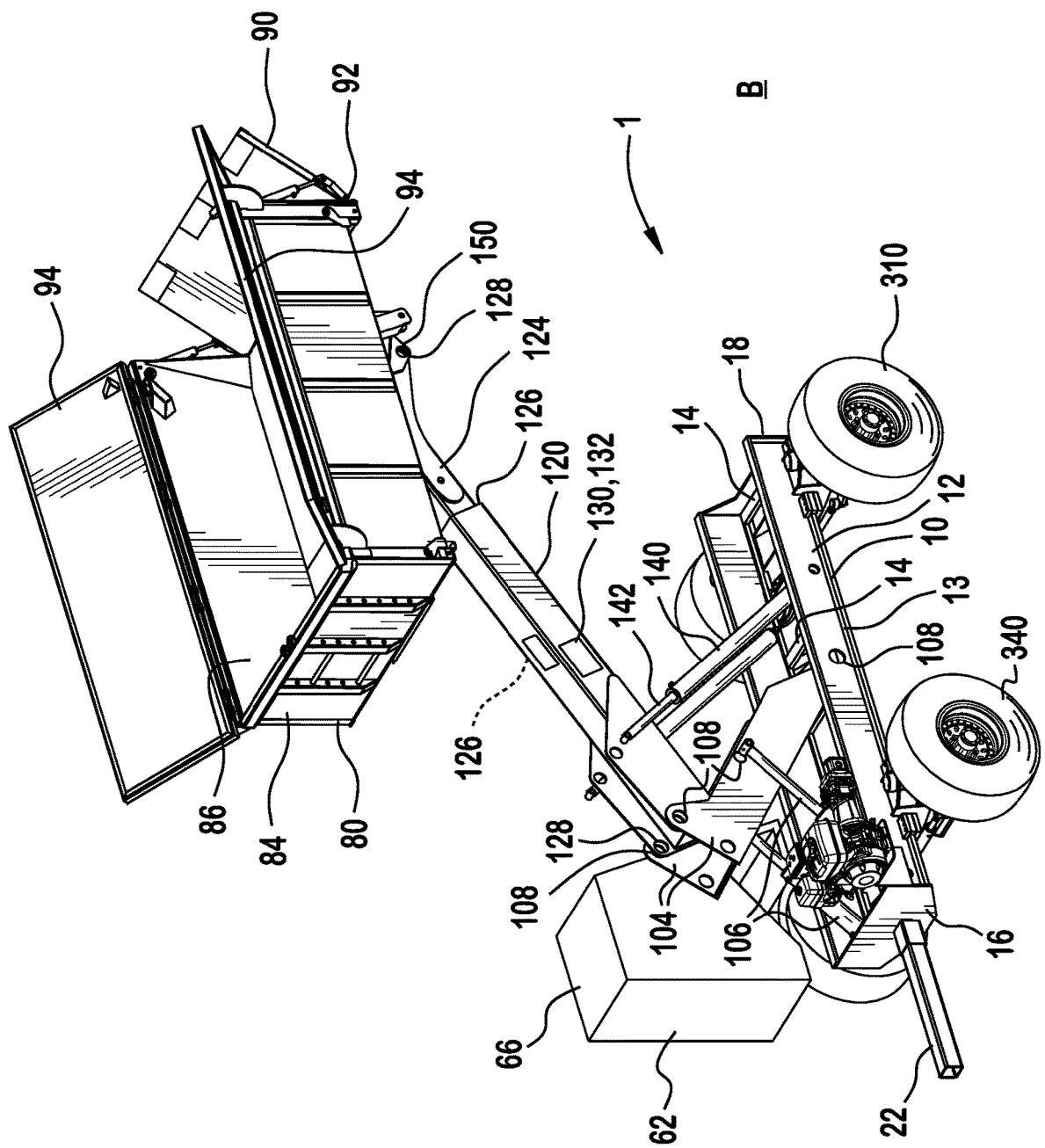
FIG. 5 is a front perspective view of the trailer of FIG. 3, showing further extension and inclination of the storage bin.
Figure 6:
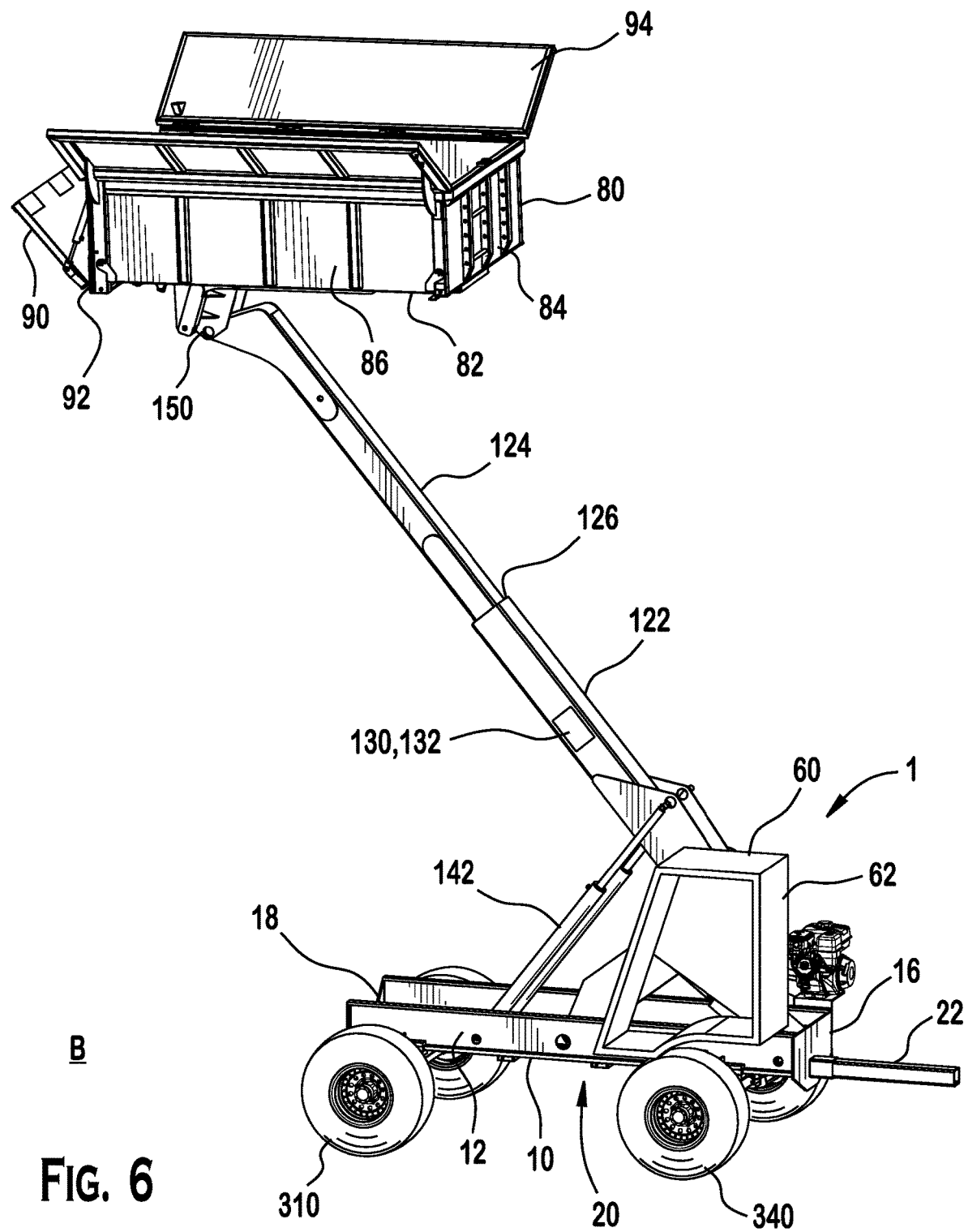
FIG. 6 is a rear perspective view of the trailer of FIG. 5.

As shown in FIGS. 2 and 3, each support beam 12 is an elongated metal support extending along a length of the frame 10, from a trailing end to a leading end thereof.

In the embodiment shown, each support beam 12 is I-shaped and includes a support rail 13 positioned on a lower end and running along a length thereof.

Each connection beam 14 runs substantially perpendicular and connecting to the plurality of support beams 12. The front support 16 is a plate like member connecting the support beams 12 at a front end thereof, while the rear support is another plat like member connecting the support beams 12 at an opposite end thereof. As assembled, the support beams 12, connection beams 14, front support 16, and rear support form a undercarriage chassis 20

As shown, in an exemplary embodiment of the invention, the trailer connection section 22 is a trailer hitch 22 positioned and connected to a leading end of the frame 10, and, in particular, the front support 16. The trailer hitch 22 includes a connector for connecting with a truck (i.e., ball mount; not shown).

According to the invention, the trailer 1 includes a tandem wheel assembly 300. In an exemplary embodiment of the invention, the tandem wheel assembly 300 is positioned under the undercarriage chassis 20 and generally includes a rear wheel assembly 310, a front wheel assembly 340, and an extension assembly 380.

Figure 8:
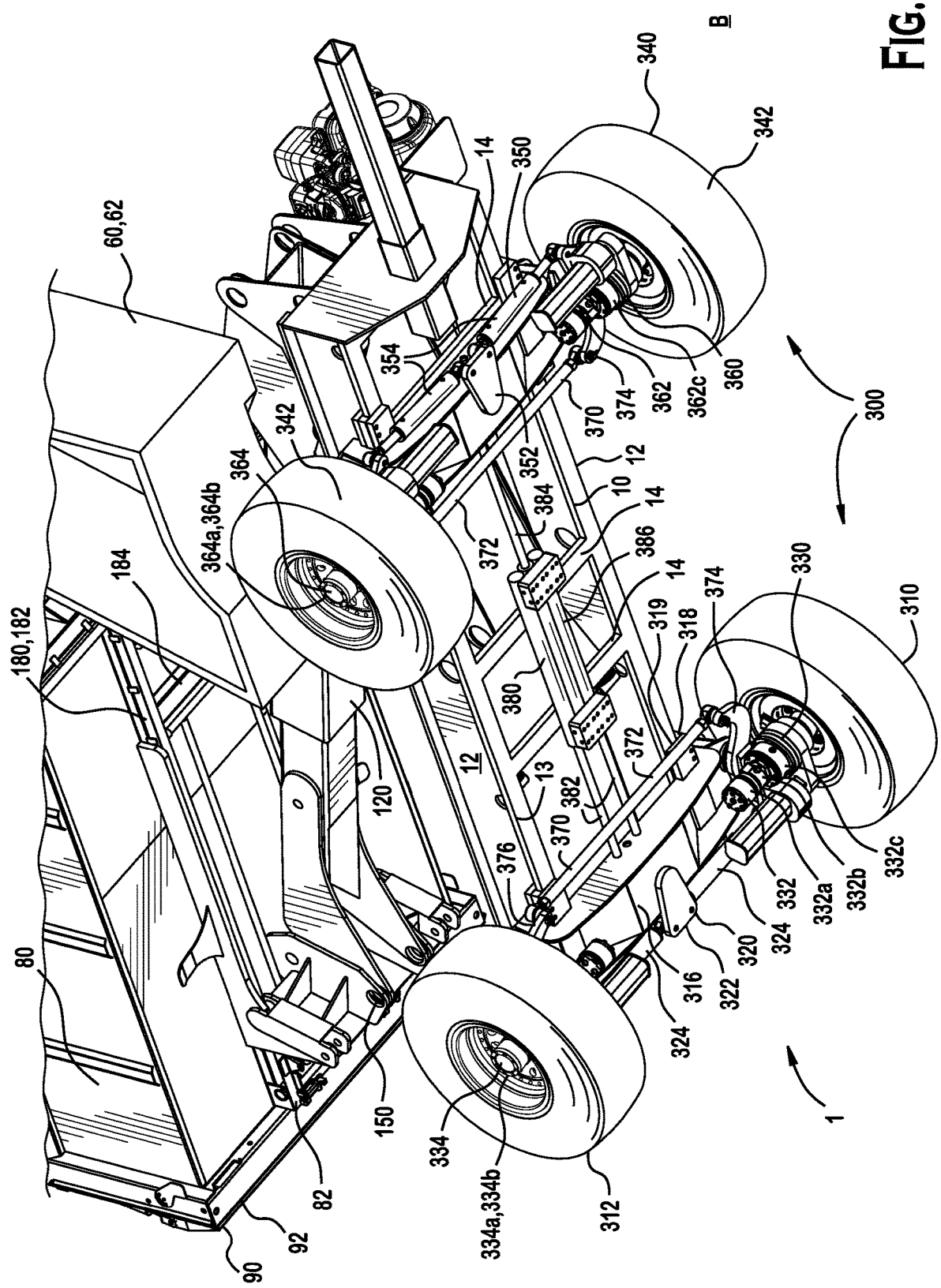
FIG. 8 is a bottom perspective view of the self-propelled tandem axle trailer according to the invention.

As shown in FIG. 8, the rear wheel assembly 310 includes a pair of rear wheels 312, a rear wheel frame 314, a rear steering assembly 320, and a rear drive assembly 330.

In the embodiment shown, the rear wheel frame 314 includes a rear guide member 315 member having a body 316 and a pair of low friction guides 318 positioned at opposite side ends thereof. Each low friction guide 318 is a u-shaped member secured to the rear wheel frame 314 and is sized and shaped to correspond to receive the support rail 13. The low friction guide 318 includes low frictions pads 319 are bearing pads known in the art to provide a low friction coefficient between the rear wheel frame 314 and the support rail 13. In the shown embodiment, the low friction pads 319 line an inside surface of the low friction guide 318.

In the embodiment shown, the rear wheel assembly 310 includes steering capability using a rear steering assembly 320 according to the invention. However, one skilled in the art should appreciate that these rear wheels 312 may be non-steerable. As shown, the rear steering assembly includes a steering bracket 322, a pair of steering arms 324 connected to the steering bracket 322 and the pair of rear wheels 312.

As shown in FIG. 8, in an exemplary embodiment of the invention, the rear wheel assembly 310 includes a rear drive assembly 330 according to the invention. In an exemplary embodiment of the invention, the rear drive assembly 330 includes a hydraulic motor assembly 332 and a rotor assembly 334, and an engagement assembly 370 for each rear wheel 312.

In an embodiment of the invention, the hydraulic motor assembly 332 generally includes a motor 332a, a motor drive mechanism 332b, and a motor housing 332c. The motor 332a is connected to the control system 60 using hydraulic lines (not shown). The motor 332a is attached to the outside of the motor housing 332c. The motor drive mechanism 332b positioned in a motor housing 332c is engageable with the hydraulic motor 332a and moveable by the engagement assembly 370.

In an embodiment of the invention, the rotor assembly 334 includes a wheel hub 334a and a drive shaft 334b with a rotor drive mechanism (not shown) engageable with the motor drive mechanism 332b by the engagement assembly 370. The drive shaft 334b connected to the wheel hub 334a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the rear drive assembly 330 may include other methods to move the rear wheels 312, including chains, belts, or a drive shaft and a transmission connected to a combustion or electric engine, so that trailer 1 can be moved around a work site under its own power.

Figure 7:
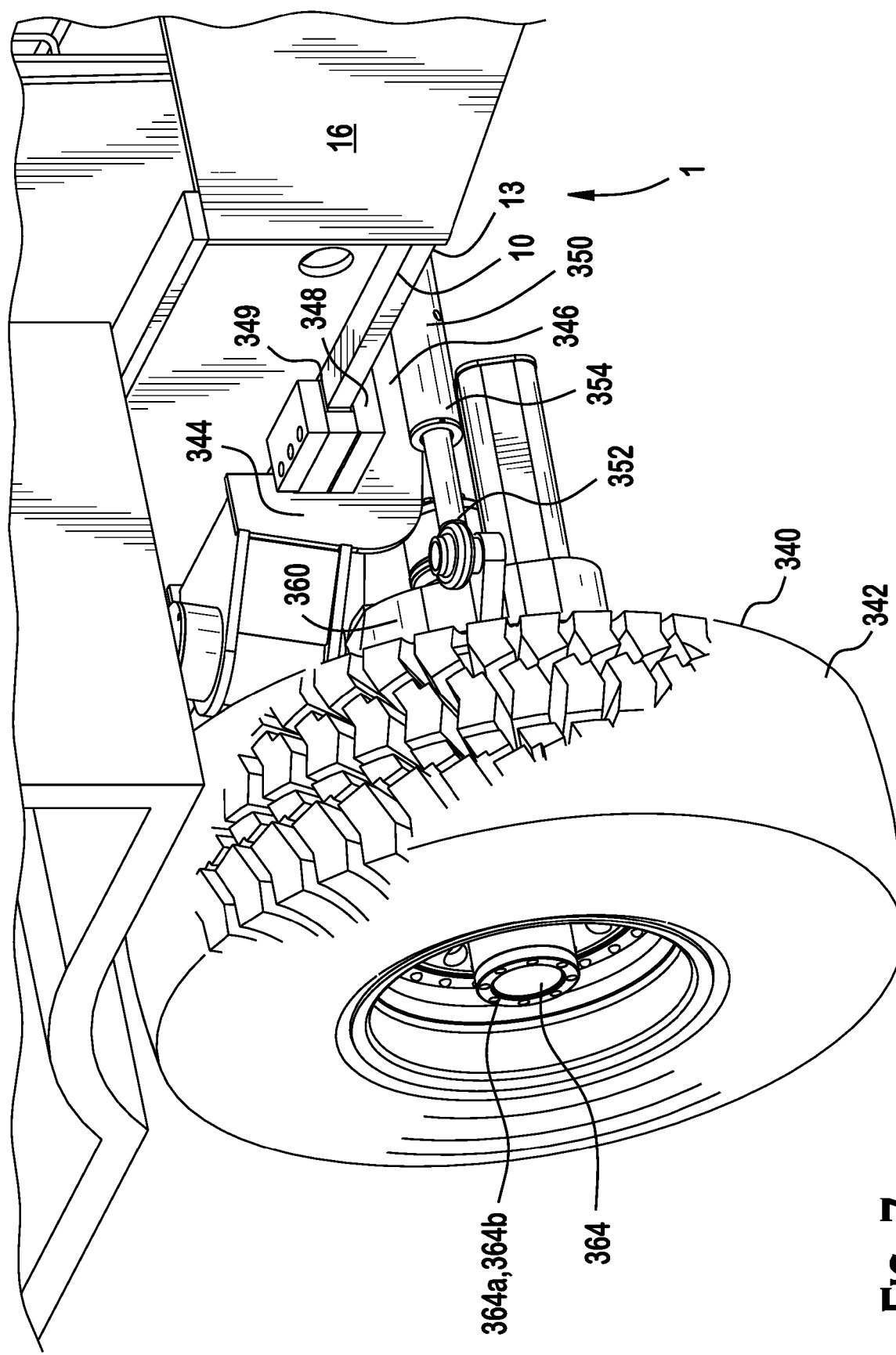
FIG. 7 is a close up view of a front wheel of the self-propelled tandem axle trailer according to the invention.

As shown in FIGS. 7 and 8, the front wheel assembly 340 includes a pair of front wheels 342, a front wheel frame 344, a front steering 350 assembly, and a front drive assembly 360.

In the embodiment shown, the front wheel frame 344 is u-shaped member having a body 346 and a pair of low friction guides 348 positioned at opposite side ends thereof. Each low friction guide 348 is a u-shaped member secured to the front wheel frame 344 and is sized and shaped to correspond to receive the support rail 13. The low friction guide 348 includes low frictions pads 349 that are bearing pads known in the art to provide a low friction coefficient between the front wheel frame 344 and the support rail 13. In the shown embodiment, the low friction pads 349 line an inside surface of the low friction guide 318.

In the embodiment shown, the front wheel assembly 340 includes steering capability using a front steering assembly 350 according to the invention. However, one skilled in the art should appreciate that this front wheels 342 may be non-steerable. As shown, the front steering assembly includes a steering bracket 352, a pair of steering arms 354 connected to the steering bracket 352 and the pair of front wheels 342.

As shown in FIG. 8, in an exemplary embodiment of the invention, the front wheel assembly 340 includes a front drive assembly 360 according to the invention. However, one skilled in the art should appreciate that these front wheels 342 may be non-driveable, without a drive system.

In an exemplary embodiment of the invention, the front drive assembly 360 generally includes a hydraulic motor assembly 362 and a rotor assembly 364, and an engagement assembly 370 for each front wheel 342.

In an embodiment of the invention, the motor assembly 362 generally includes a motor 362a, a motor drive mechanism 362b, and a motor housing 362c. The motor 362a is connected to the control system 60 using hydraulic lines (not shown). The motor 362a is attached to the outside of the motor housing 362c. The motor drive mechanism 362b positioned in a motor housing 362c is engageable with the hydraulic motor 362a and moveable by the engagement assembly 370.

In an embodiment of the invention, the rotor assembly 364 includes a wheel hub 364a and a drive shaft 364b with a rotor drive mechanism (not shown) engageable with the motor drive mechanism 362b by the engagement assembly 370. The drive shaft 364b connected to the wheel hub 364a.

Many of the power system components are not shown for sake of complexity in the drawings, although a discussion is provided for purposes of enabling one skilled in the art to understand how the drive system is assembled and performed. One skilled in art should appreciate that other designs are possible. For instance, the front drive assembly 360 may include other methods to move the front wheels 342, including chains, belts, or a drive shaft and a transmission connected to a combustion or electric engine, so that trailer 1 can be moved around a work site under its own power.

In the shown embodiment, the rear wheel assembly 310 and the front wheel assembly 340 includes an engagement assembly 370. As shown, each engagement assembly 370 generally includes a main shaft 372, a first lever assembly 374, and a second lever assembly 376. The main shaft 372 is an elongated cylindrical member and connected to the first lever assembly 374 and the second lever assembly 376 at opposite ends thereof. The first lever assembly 374 and the second lever assembly 376 are connected to opposite rear wheels 312 or front wheel 342, and engage and disengage the motor drive mechanism 332b, 362b, from the rotor drive mechanism (not shown) to rotate the wheel hub 334a, 364a.

In an exemplary embodiment of the invention, the extension assembly 380 generally includes a rear end connector 382, a moveable axle connector 384, and a moving component 386. The rear end connector 382 is connected to the rear wheel assembly 310, while the moveable axle connector 384 is connected to the front wheel assembly 340. The moving component 386 is a hydraulic actuator positioned and secure to the undercarriage chassis 20 in the shown embodiment. The moving component 386 is capable of extension and contraction. When connected to the front wheel assembly 340, the front wheels 342 can be positioned between the trailing position A (see FIGS. 1 and 2) and the self-propelled position B (see FIGS. 5-8).

Figure 9A:
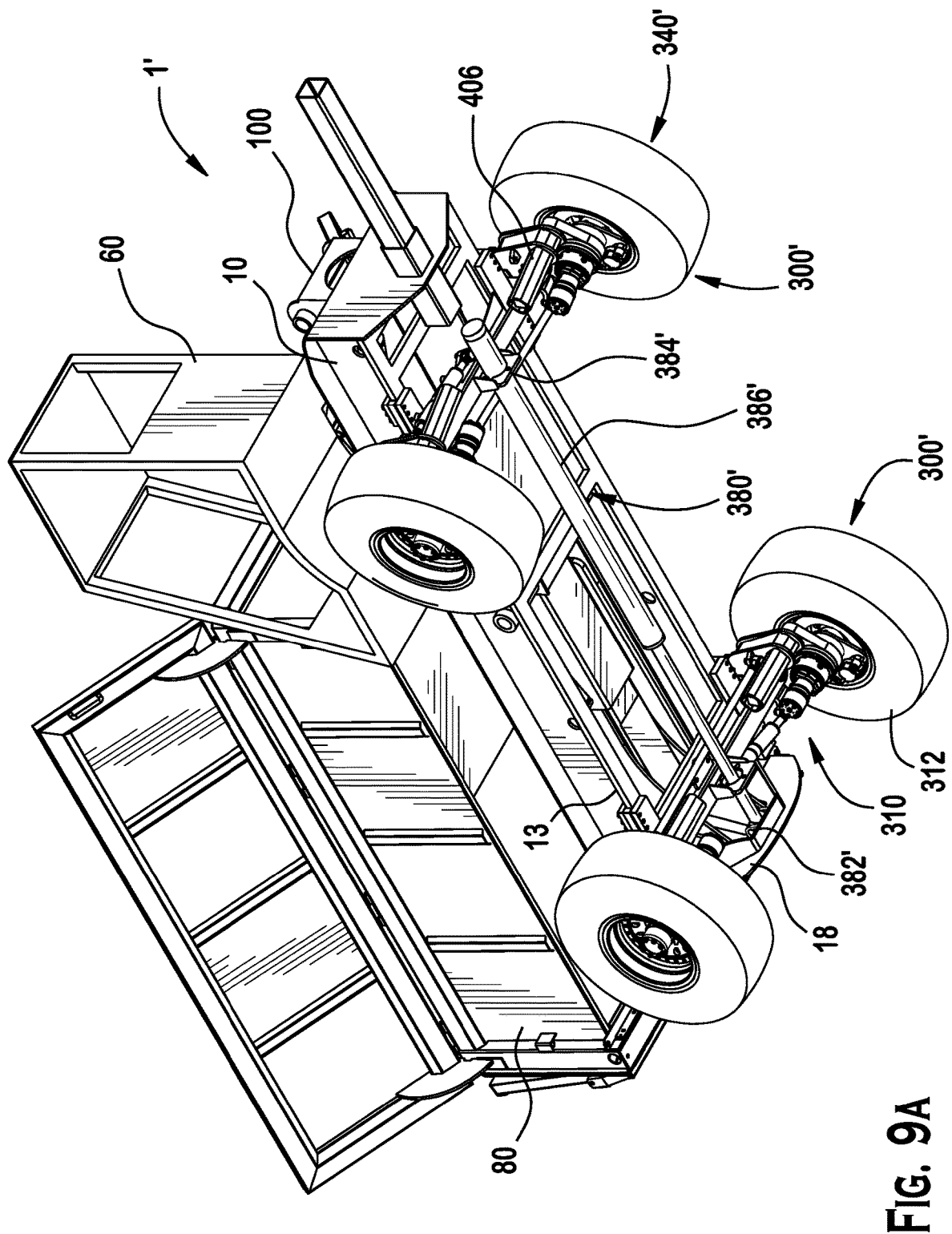
FIG. 9A is a bottom perspective view of another embodiment of the self-propelled tandem axle trailer according to the invention.
Figure 9B:
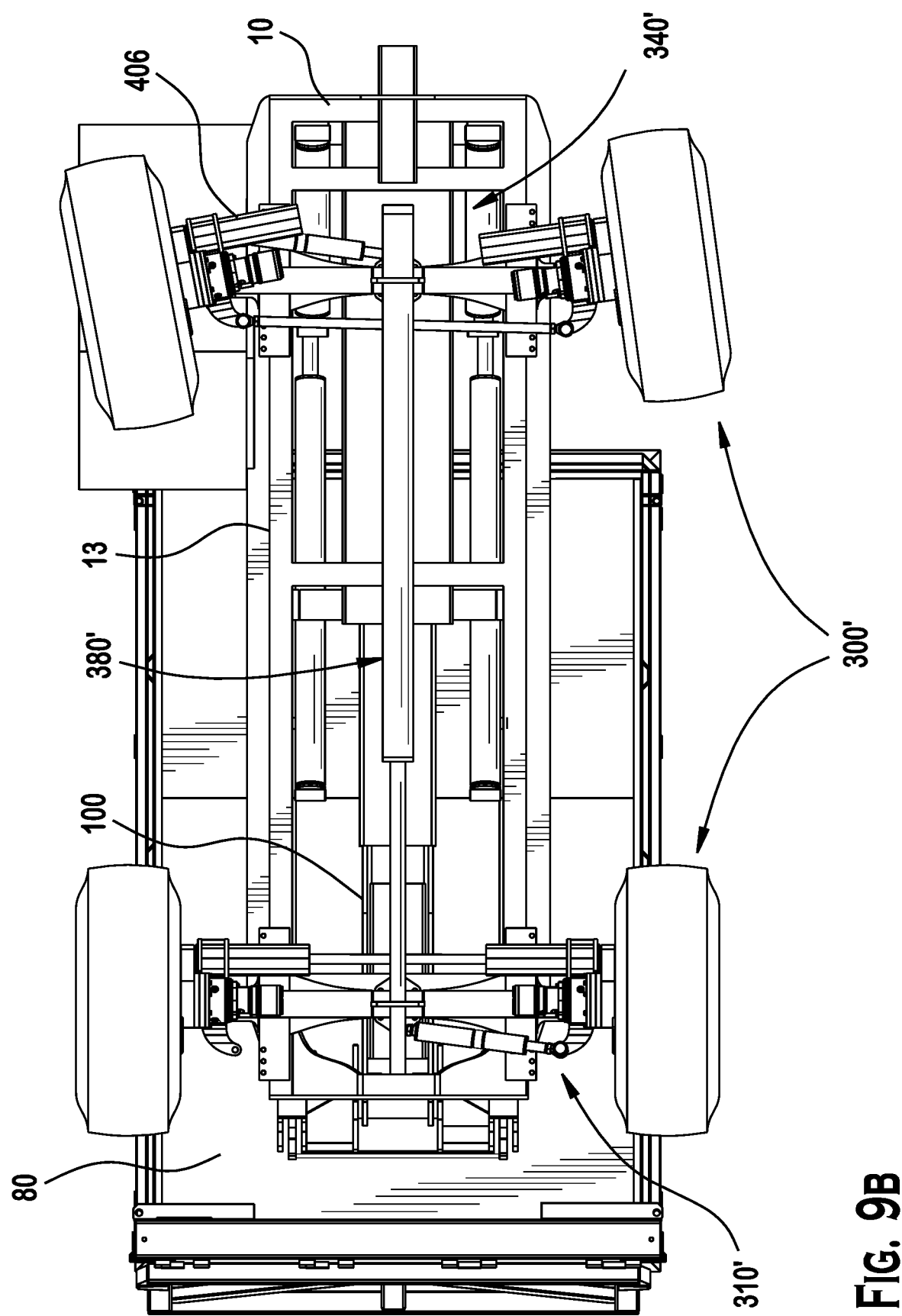
FIG. 9B is a bottom view of the self-propelled tandem axle trailer of FIG. 9A.

FIGS. 9A and 9B depict an alternate exemplary embodiment of a self-propelled steerable trailer. The trailer 1' of FIGS. 9A and 9B generally includes the following major components: a frame 10, a control system 60, a storage bin 80, and an extension device 100, as discussed previously, and an alternate tandem wheel assembly 300'. Though not depicted in FIG. 9A or B, it is contemplated that the trailer 1' would beneficially include a source of power, similar to the example power source depicted in FIGS. 1-6, and 8, and may, in an embodiment, be one or more of batteries and/or combustion engines. The power source may power or otherwise enable the powered movement and actions of the various features of the trailer described herein, including power for self-propelled transport, steering, braking, extension and/or retraction of the tandem wheel assembly, and movement of the storage bin, relative to the frame.

As shown in FIG. 9A, the alternate tandem wheel assembly 300' is positioned under the frame 10, and generally includes a rear wheel assembly 310', a front wheel assembly 340', and an extension assembly 380'. As described previously, the tandem wheel assembly provides for a front wheel assembly that is movably secured to the support rails 13, such that the front wheel assembly can selectively be positioned in the trailing position A (seen with reference to FIGS. 1 and 2), and the self-propelled position B, depicted in FIG. 9A, or any intervening position between them.

In any of the trailer embodiments, the front wheel assembly 340' may optionally be secured in either, or both, of the position A or B, by an actuatable locking mechanism, such as a manually or mechanically engaged locking mechanism, for example, locking pins, and the like, that secure the wheel assembly and frame elements so as to prevent unwanted movement relative to each other. Alternatively, the front wheel assembly may be maintained in the desired position through the actuation mechanism, for example, maintaining hydraulic pressure in a hydraulic actuator to secure the front wheel assembly in the desired position, such as when travelling, trailering, or parked and at rest.

FIG. 9A depicts the rear wheel assembly 310' having a pair of rear wheels 312, mounted to the hubs of the wheel assembly. Further aspects of a wheel assembly are discussed below. In an embodiment, the rear wheel assembly 310' may be fixedly secured in a position relative to the frame; for example, the rear wheel assembly may be immovably secured to the support rails 13. The rear wheel assembly may be affixed or secured using techniques known to those skilled in the art. For example, the rear wheel assembly may be mounted to the frame 10 or support rails 13 through the use of one or more fasteners, including for example, mounting posts, bolts and/or nuts, to secure the wheel assembly to the support rails or other frame portion; or alternatively, a portion of the rear wheel assembly may be welded to the support rails 13 or other portion of the frame 10.

Figure 10:
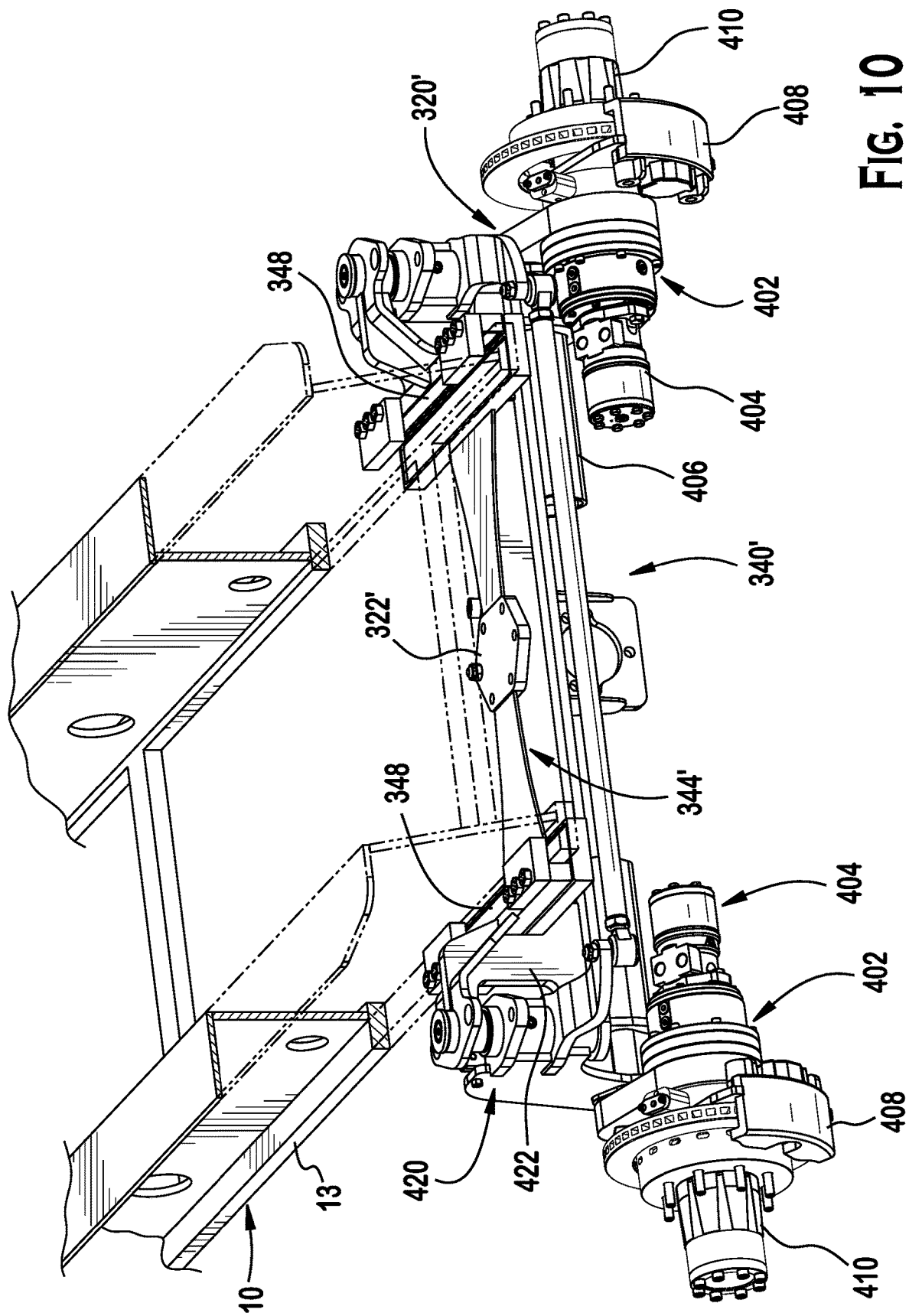
FIG. 10 is a perspective front partial view of an alternative embodiment of a front wheel assembly of the self-propelled tandem axle trailer according to the invention.

Also depicted in FIG. 9A is a front wheel assembly 340', having a pair of wheels 342, mounted on hubs of the front wheel assembly. In an embodiment, the front wheel assembly is movably mounted upon the frame 10 of the trailer; for example, by the use one or more u-shaped members slidably mounted on the front wheel frame, where the u-shaped member is sized and shaped to receive at least a portion of the support rail 13 of the frame, as depicted in FIGS. 9 and 10. The u-shaped member may be provided with low friction guide elements 349, including low friction pads that serve as bearing pads known in the art to provide a low friction coefficient between the front wheel frame 344' and the support rail 13. In this manner, the front wheel assembly is movably secured to the frame in a manner that allows the wheel assembly to slide upon the frame support rails, and be alternately positioned in a trailer position A (depicted in FIG. 1), and the self-propelled position B as depicted in FIG. 9, or any point in between. As can be seen in the exemplary embodiment of FIG. 10, the front wheel assembly 340' is provided with u-shaped members slidably mounted on separate, parallel support rails 13 on the frame 10, and are positioned such that the u-shaped members prevent twisting movement of the front wheel assembly, relative to the frame, as the spacing provided between the inside dimensions of the opposing u-shaped members is substantially the same, or nearly the same, as the maximum width dimension of the support rails 13.

In an exemplary embodiment of the invention, as depicted in FIG. 9A, the extension assembly 380 generally includes a fixed end connector 382' that may be affixed to the frame at or near the rear support plate 18, though it is contemplated that alternatively, the connector 382' may be secured to the rear wheel assembly, which is itself fixed relative to the frame. The extension assembly 380 further provides a moveable axle connector 384', and a moving component 386'. The fixed end connector 382', as depicted in FIG. 9A may optionally be directed through a bracket opening on the rear wheel assembly 310' and affixed to the rear support plate 18 of the frame 10. The fixed end connector 382' may alternatively be secured to the frame 10 at any point rearward of the front axle when in trailering position A of FIG. 1, so as the extension assembly is extended, the forward axle assembly is urged away from the fixation point on the frame. Though not shown, it is contemplated that the extension assembly may be configured in the reverse orientation (not depicted), where an extension assembly is alternatively secured to the frame at a mounting point forward of the front axle when in position B of FIG. 3, where extension of the extension assembly urges the front axle rearward into position A for trailering, and retraction of the extension assembly urges the front axle to position B for self-propelled movement of the trailer.

In an embodiment, as depicted in FIG. 9A, the fixed end connector 382' near the rear of the trailer may be the end portion of a linear actuator of the extension assembly 380', which may fit into a bracket and secured in place against the rear support plate 18 of the frame 10. The extension assembly 380' further provides for a moveable axle connector 384' on the front wheel assembly 340'. In an embodiment, the front wheel assembly 340' may have a bracket that secures to a portion of the linear actuator of the extension assembly 380' and serves as the moveable axle connector 384', as depicted in FIG. 9A. The moving component 386' may be any suitable form of linear actuator, for example, a hydraulic actuator positioned and secured to the undercarriage chassis 20, or frame 10'. The moving component 386' is capable of extension and contraction. In an embodiment, the moving component 386' is a double acting hydraulic cylinder. In an embodiment, the front wheel assembly 340' is secured to a portion of the cylinder barrel of the hydraulic cylinder, and the piston rod is secured to the rear of the frame. It is contemplated that where the moving component is a hydraulic cylinder, the positioning of the cylinder components may be mounted in reverse, with the piston rod affixed to the front wheel assembly, and the cylinder barrel secured to frame 10 closer to the rear of the trailer 1', or alternatively, directly connected to the rear wheel assembly 310'. It is contemplated, that in any mounting configuration where the linear actuator is connected to the front wheel assembly 340', the front wheel assembly 340' can selectively be positioned between the trailing position A (see FIGS. 1 and 2) and the self-propelled position B (see FIGS. 9A and B), by the action of the linear actuator.

Details of the front wheel assembly 340' and rear wheel assembly 310' will now be discussed with reference to FIGS. 10 and 14A and B. For simplicity, the front wheel assembly 340' will be described, though applicable to the features of the rear wheel assembly 310' as well. An isolated front wheel assembly 340' is depicted in FIG. 10 in front perspective view. FIG. 14A presents a top view of the isolated wheel assembly, with the u-shaped brackets removed for clarity. FIG. 14B presents a bottom view of the isolated wheel assembly. It is anticipated that the depicted wheel assembly in FIGS. 10 and 14 may be deployed as one or both of the front wheel assembly or rear wheel assembly.

For simplicity, FIG. 10 will be described in the context of being a front wheel assembly 340', though applicable to either front or rear wheel assembly. With reference to FIG. 10, the front wheel assembly 340' as shown may be provided with a wheel assembly frame 344', a steering assembly 350', and a pair of hub assemblies 402.

Each hub assembly 402 includes a drive assembly 404, a suspension assembly 406, brake assembly 408, and hub 410 upon which a wheel is to be mounted. The front wheel assembly 340' of FIG. 10 may provide steering capability, motive and braking force to the trailer 1', as well as serving as a suspension, to isolate or minimize the effects of irregular surface features from the frame while the trailer is in motion. The front wheel assembly 340' of FIGS. 10 and 14 however features marked differences from those wheel assemblies described previously; for example, each wheel assembly is provided with a single steering actuator, rather than two steering arms as previously described, resulting in a simpler, more cost effective design, where each wheel of the wheel assembly is maintained at a consistent angle, relative to the other wheel of the wheel assembly through the use of a mechanical linkage, such as a tie rod, extended between each hub assembly to ensure each hub assembly's steering angle consistent with the other.

As can be seen with reference to FIGS. 10 and 14A and B, exemplary front wheel assembly 340' in the depicted embodiment may include a pair of hubs configured to accept the mounting of wheels thereupon, with the wheels removed for clarity, a drive assembly, a brake assembly 408, a wheel assembly frame, a steering assembly, and suspension assembly. The wheel assembly of FIGS. 10 and 14 may be deployed as either, or both, of the front and rear wheel assemblies. It is contemplated that one of the wheel assembly embodiment depicted in FIG. 10 may be combined with a different embodiment of a wheel assembly, for example, the wheel assembly described previously with reference to FIG. 8.

In an embodiment, the wheel assembly frame 344 may provide support for mounting the other wheel assembly components from, and may be, for example, a truss or beam extended between the aforementioned u-shaped low friction guides 348 configured to slide upon the frame rails 13.

The wheel assembly embodiment 340', as can be seen with reference to FIGS. 14A and 14B provides a steering capability through the action of a steering assembly 350' according to the invention. As depicted, the steering assembly 350' includes a steering bracket 322' which may be affixed to, or otherwise be made as part of the wheel assembly frame, a steering arm 324' (depicted in FIG. 14) extended between the steering bracket 322' and a steering arm mount 412 on a primary hub assembly. The steering assembly further comprises a tie rod 414 extended between steering knuckles 416 on each of the hub assemblies. In order to allow for independent suspension travel, each of the steering arm and tie rod end connections may be provided with a ball joint 418, or other suitable securement mechanism, wherein the securement is compatible with expected vertical angular change of the arm or tie rod, relative to the respective mounting point. The steering assembly 350', as depicted in FIG. 14A allows for steering forces to be imparted through the steering arm 324', which may be a hydraulic actuator, or any other suitable linear actuator, which will cause the turning of the primary hub assembly (the hub assembly which is directly acted upon by the steering arm); thereupon the steering force is transmitted to a secondary hub assembly via any suitable linkage, for example a mechanical linkage, such as tie rod 414, which ensures that the primary and secondary hub assembly turn in unison. As depicted in the exemplary embodiment of FIG. 10, the hub assembly is pivotably mounted to the wheel assembly frame 344. The wheel assembly frame 344 can be any rigid form of connection between hub assemblies on the same wheel assembly. The wheel assembly 340' may provide for a suspension mount 420, by which the hub assembly may be secured onto the wheel assembly 344 frame. As depicted in FIG. 10, and in the exploded view of FIG. 13, the wheel assembly frame 344 has, at each end of the frame, a yoke 422, with a portion of the hub assembly fitting between the arms of the yoke, whereupon the hub assembly is pivotably secured by placement of a king pin 426 extended through the top arm of the yoke, through a portion of the hub assembly, and into the bottom arm of the yoke. By utilizing a king pin and yoke arrangement to mount the hub assembly to the frame, the hub assembly is allowed the freedom to pivot on the king pin 426, supported by the yoke 422, within a desired range of steering angles. In this manner, each of the hub assemblies can pivot about an axis in alignment with the center of its mounting king pin 426. It is contemplated that the king pin 426 may be fixed generally vertically within the yoke 422, or may be at an angle other than precisely vertical, where varying the angle of the king pin is understood by those skilled in the art to impart desired properties by determining the shape of the tire contact patch at straight and other steering angles, or provide self-centering steering tendencies to the hub assemblies, or other properties (such as understeer or oversteer), while in use.

As was noted previously, either or both of the front and rear wheel assemblies may independently provide steering capabilities to the trailer 1'. It is contemplated that the trailer 1' of FIG. 9A may selectively employ rear wheel steering, front wheel steering, or 4-wheel steering. It is contemplated that the 4-wheel steering may be a round steer mode, providing for the front and rear wheel assemblies to turn in opposite directions, whether in the same or proportional amounts, in order to enhance maneuverability by reducing the turning radius of the trailer 1' when moving in a self-propelled fashion. Alternatively, the 4-wheel steering may be in oblique steer mode, providing for front and rear wheel assemblies to turn in the same direction, whether in the same or proportional amounts, whereby the trailer 1' may move crabwise, by moving to the side as it is moving either forward or backward. It is contemplated that in order to minimize the turning radius, the extension assembly may be adjusted to be less than fully extended (so that the front wheel assembly is at a point between position A and position B, in order to shorten the wheelbase by moving the front wheel assembly in a direction towards the middle of the trailer, and thereby reduce the turning radius of the trailer, especially when employing round steer mode of four wheel steering. In this circumstance, the center of gravity for the trailer should remain within the dimensions defined by the axles, so as to avoid disrupting the balance of the trailer.

Each hub assembly for each of the wheel assemblies for the trailer 1' may have a brake assembly 408, by which the rotation of the wheels on the wheel assembly may be selectively slowed, or stopped from rotation. In the exemplary embodiment of the wheel assembly of FIGS. 10 and 14, each brake assembly 408 is provided with a brake rotor, located adjacent to the wheel hub 410, where each brake rotor may be acted upon by a brake caliper (as can be seen in FIG. 10). As depicted herein, a hub 410 is any suitable mount for a wheel, as is commonly known, and typically fits concentrically within a center opening of a wheel, and may be secured with one or more fasteners, such as lug nuts secured to wheel studs. The brake disk would rotate with the wheel and hub assembly as is commonly known, while the trailer is moving, and the brake caliper would apply a braking force via a brake pad against the surface of the brake disk, whereby friction between the brake disk and the brake pad will slow, and ultimately prevent the rotation of the wheel on the hub. The brake assembly 408 may be actuated hydraulically, electrically, pneumatically, or mechanically. It is contemplated that any of the brake assemblies may be actuated independently, so as to slow or prevent the rotation of any single wheel, or alternatively, the brake assemblies may be actuated in pairs (fronts or rears) together, or further, the brake assemblies may be actuated all together, so as to provide four wheel braking, or prevent rotation of all four wheels simultaneously. It is contemplated that one or more of the brake assemblies may be actuated to secure the trailer 1' in a desired position, acting as a parking brake. Any of the brake assemblies 408 may alternatively employ a pair of brake pads applied against each surface of the brake disk, as is common conventionally with automobiles. Given that relatively low speeds would be anticipated with the trailer system, as it is moving under its own power, it is also contemplated that the braking system may alternatively employ a single brake pad applied against the brake disk surface. In an alternative embodiment, it is contemplated that alternative braking solutions are possible, using, for example, drum brakes as are well understood, or alternatively, using a hydraulic drive system (discussed below), which may provide braking force for the trailer, whether as a supplement to the disk brake system previously described, or as a replacement, such that the hydraulic motor may function as the brake system for the trailer, obviating the need for a disk and caliper brake system, where the hydraulic motor system is employed to provide fluid resistance to the rotation of the wheel and hub, thereby providing braking or locking of the wheel and hub from rotation.

Figure 11A:
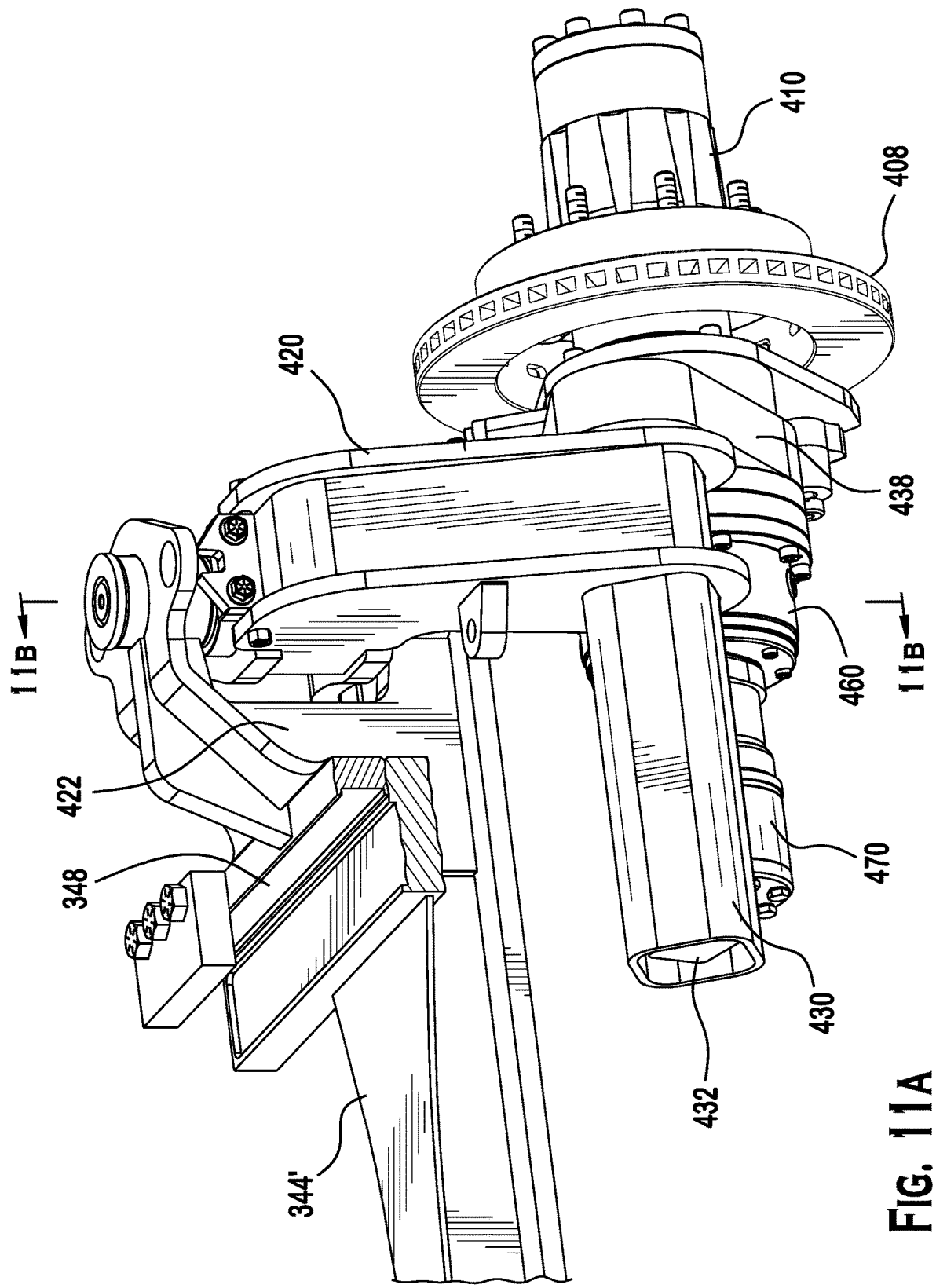
FIG. 11A is a close up, rear view of a suspension, drive and hub assembly of the self-propelled tandem axle trailer according to the invention.
Figure 11B:
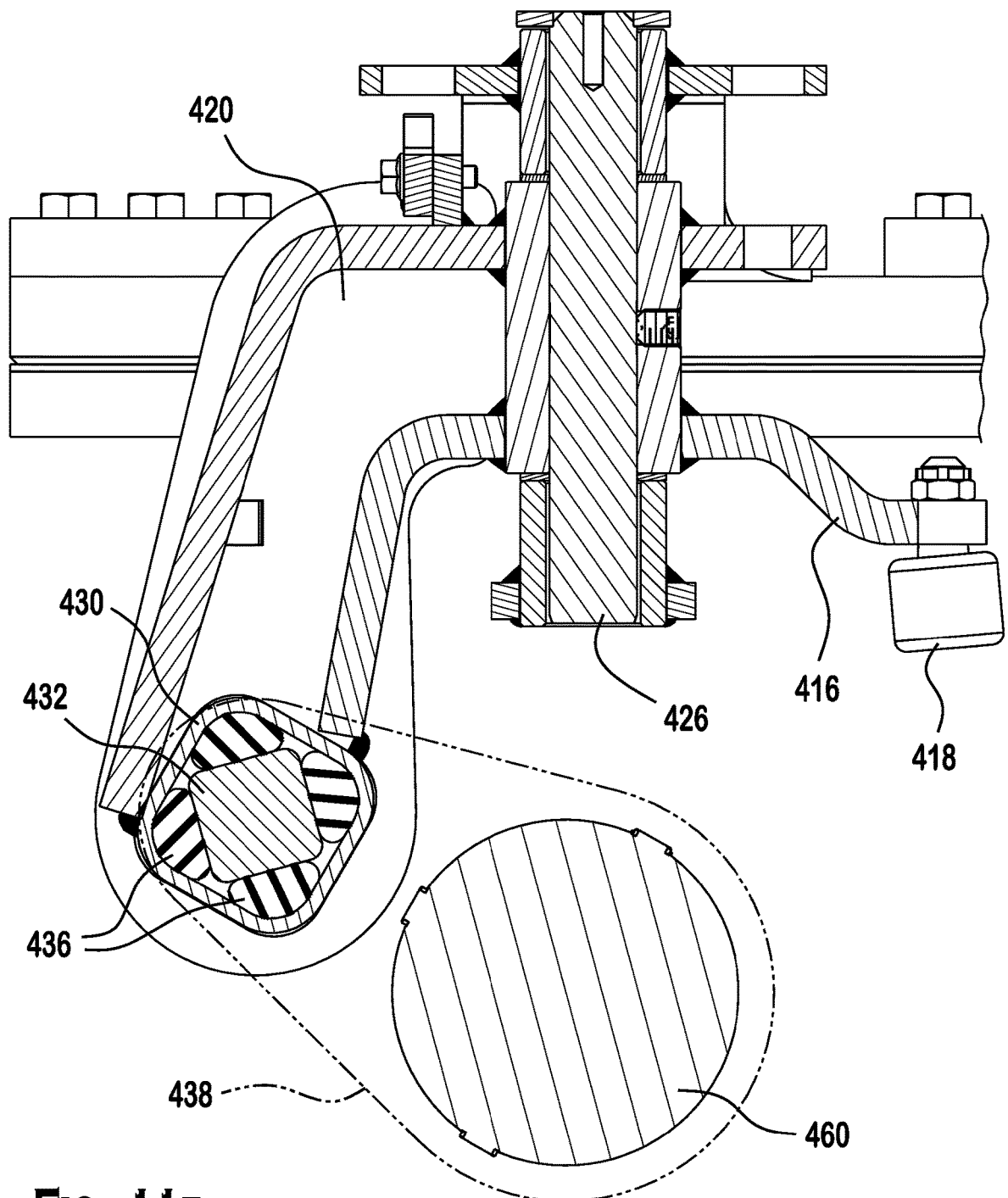
FIG. 11B is cross-section view of the suspension components of FIG. 11A.

Each of the hub assemblies may have a suspension assembly that allows the independent movement of the wheel hub, relative to the wheel assembly frame, and the trailer it is affixed to, as the trailer traverses uneven ground. As depicted in FIG. 9A, and in greater detail in FIG. 11A (and in cross-section view in FIG. 11B), the suspension assembly 406 may be fixedly mounted to the pivotable portion of the hub assembly fitted between the arms of the yoke 422 of the wheel assembly frame. The suspension system may be any suitable suspension known to those skilled in the art, and be capable of allowing at least some freedom of movement, generally in a vertical direction, relative to the frame of the trailer. In the embodiment depicted in FIG. 11A, the suspension assembly 406 for each of the hub assemblies may be a torsion suspension system, providing an exterior housing 430 of a square profile tube affixed by a bracket to the suspension mount 420, which may be pivotably secured to the yoke 422. The suspension assembly 406 may further provide a torsion rod 432 in the form of an elongated form having a square profile suspended within the exterior housing 430 by a plurality of resiliently deformable elements 436 that occupy at least a portion of the space between the torsion rod 432 within the housing 430. In an embodiment, the suspension assembly, in a resting state, may have deformable elements 436 in the form of elastic cords that are situated against the flat surfaces of the interior square torsion rod 432, and simultaneously situated in the corners within the exterior housing 430. The interior square torsion rod 432 may be fixedly secured to the sprung portion of the hub assembly, whether the motor housing or the hub, via a torsion arm 438, as can be seen with reference to FIG. 11A. It is contemplated that the torsion suspension components need not be limited to being square in cross-section, and other cross-section profiles, so long as the interior rod may rotate within the confines of the exterior housing, where the rotation induces resilient deflection in the deformable elements 436 between the exterior housing and internal rod components.

Figure 15:
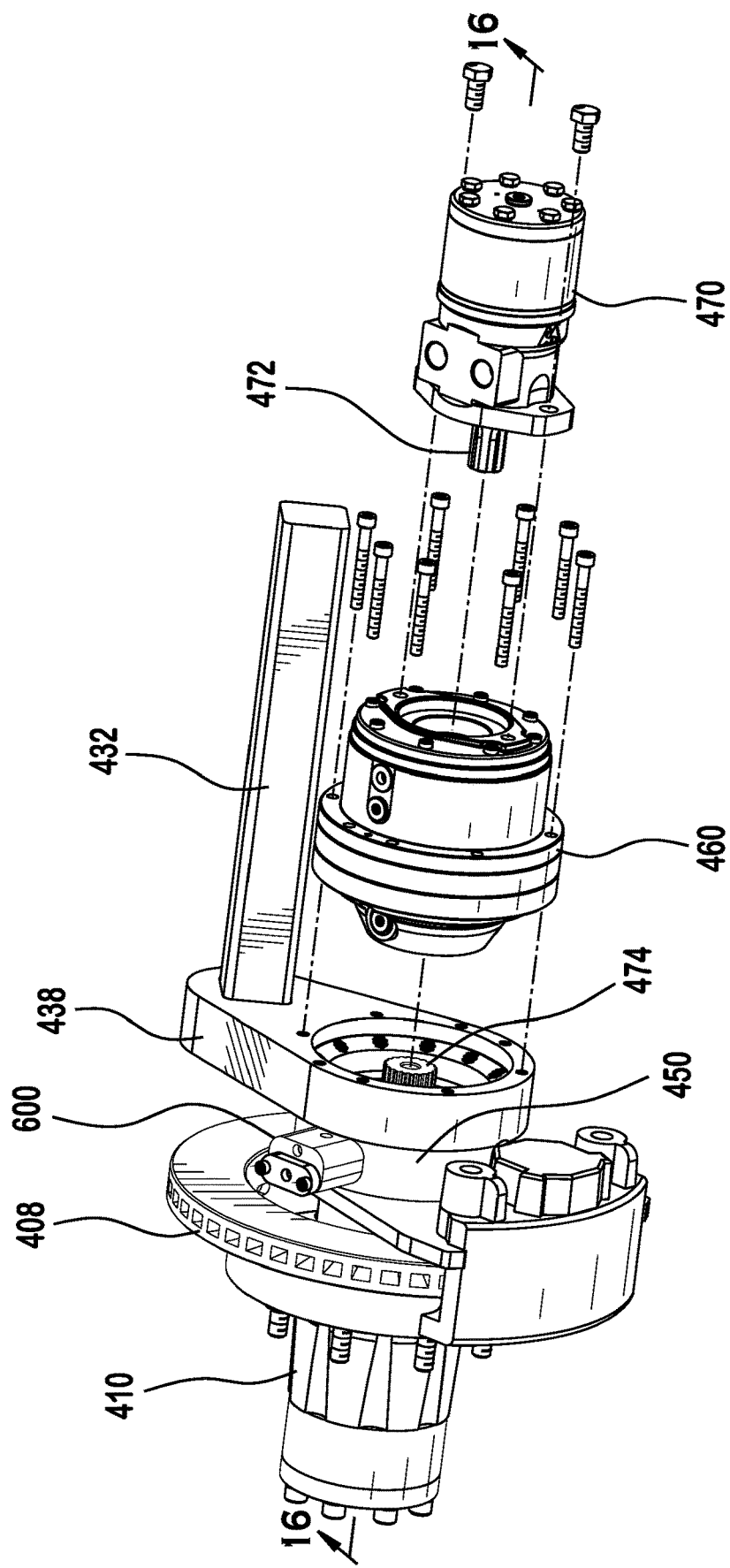
FIG. 15 is a partially exploded view of components of the wheel hub assembly depicting the motor, transmission, torsion arm, brake assembly and hub.

In an embodiment, the torsion arm 438 may be secured to any of the wheel spindle, the drive motor housing, the gear reduction housing, or the hub to which the wheel is to be mounted. As shown in FIG. 15, the torsion arm 438 at one end connects to the torsion rod 432, and at the other end of the torsion arm secures to the bell housing 476 that forms the wheel spindle 450, as well as receiving the transmission housing 460.

In operation, as the trailer 1' encounters uneven ground, each wheel may independently travel in an arc that is generally in a vertical direction (relative to the trailer frame), as the wheel, through the connecting torsion arm 438, causes the torsion rod 432 to rotate within the housing 430, resulting in the distortion of the plurality of resiliently deformable elements 436 fitted against the internal torsion rod 432 within the housing 430. Thus, the suspension serves to accommodate the vertical wheel movement, and further serving to dampen the rebound as the travel is reversed. As the wheel rebounds to its original position, the plurality of resiliently deformable elements 436 within the housing return to their initial resting shape, the rebound energy dissipating due to hysteresis, as the deflection is decreased. In an embodiment, the resiliently deformable element 436 is made from any suitable material capable of repeatedly responding resiliently to distorting forces; such deformable materials include, as non-limiting examples, rubber, and polyurethane. It is contemplated that variations in the construction of the suspension assembly would allow the suspension to accommodate a wide range of suspension travel or weight capacity. For example, a longer wheel travel may be accomplished by using a torsion arm 438 having a relatively greater length, while a greater weight capacity may be achieved by using a torsion arm 438 having a relatively lesser length, or alternatively by extending the length or other dimensions of any of the housing, deformable elements, and/or internal square rod, in order to adjust the suspension properties. The characteristics of the suspension may also be tuned by varying the shore hardness of the material comprising the resiliently deformable elements 436. It is contemplated that alternative profiles and shapes of the suspension components are possible and may be utilized similarly to achieve a functional suspension element. It is also contemplated that the resilient element may be placed in shear stress, rather than deformation stress to achieve the suspension characteristics sought, where the deformable material is secured to the internal dimensions of the exterior housing 430, and also the exterior of the interior torsion rod 432, so that suspension travel resulting in rotary movement of the torsion rod within the exterior housing places the deformable material in shear stress, which will return to initial state as the suspension is allowed to rebound.

In an exemplary embodiment, and with reference to FIG. 15, each of the hub assemblies of the trailer may include a drive assembly that is configured to selectively transmit a motive force through the drive assembly to cause the hub 410, and thus a wheel mounted upon the hub to turn, thereby propelling the trailer 1'. As can be seen with reference to the partially exploded view provided by FIG. 15, a motor 470 may be provided, which may be a hydraulic motor as depicted, though it is contemplated that the motor may instead be any suitable motor, including electric or pneumatic, which when actuated will result in the rotation of the motor output shaft 472 in a selectable direction. In an embodiment, the drive and direction of rotation of the motor 470 for each of the hub assemblies are independently, selectively reversible, so as to provide adequate maneuverability to the trailer 1' and minimize the turning radius, or allow for steering.

Figure 12A:
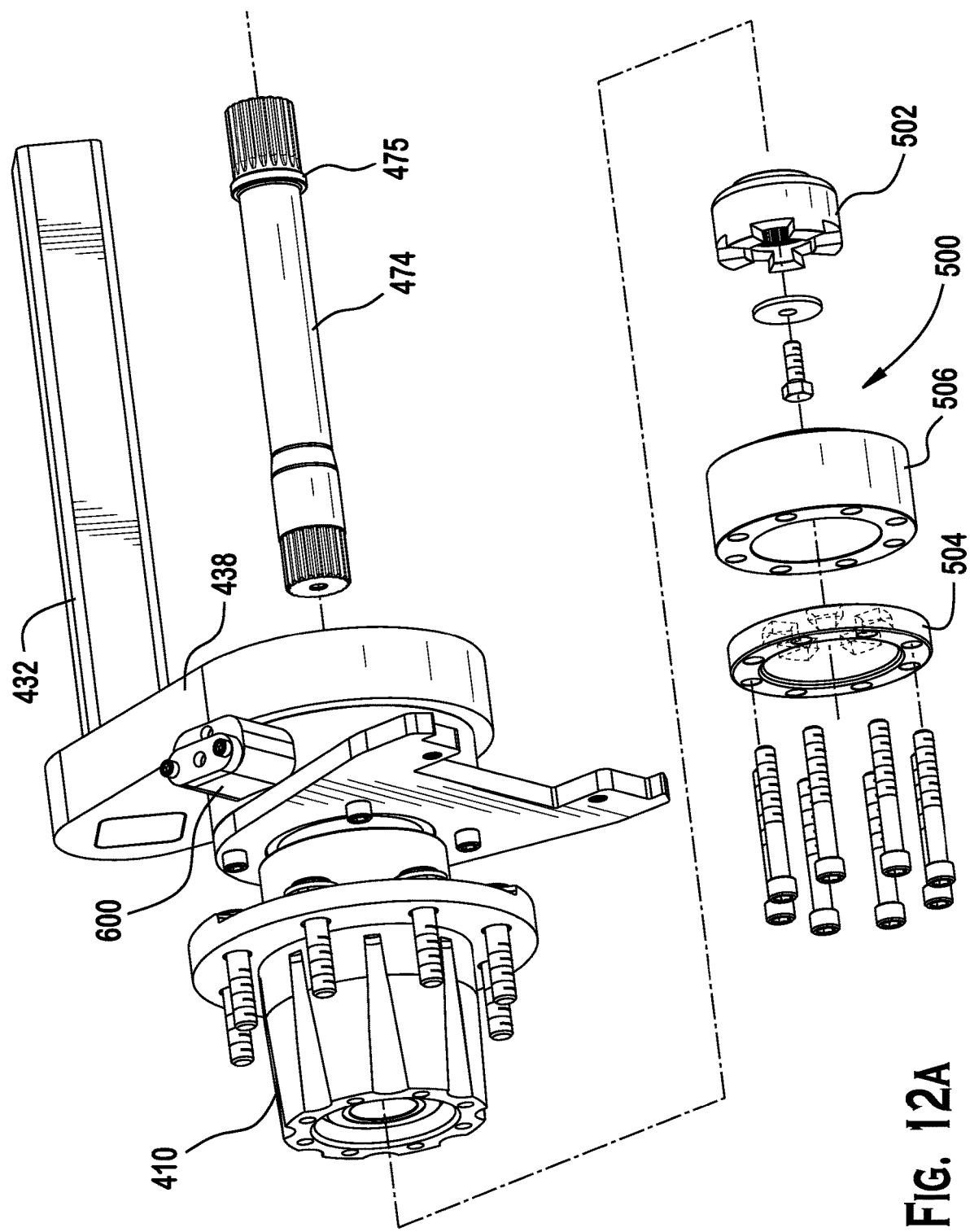
FIG. 12A is a partially exploded view of components of the drive assembly and hub assembly, including flanged driveshaft, clutch assembly, locking mechanism, and hub.

As shown in FIGS. 12A and B, the wheel assembly may be provided with a selectively engageable clutch mechanism, allowing each wheel of a wheel assembly to be driven by the motor, or to allow the hub/wheel to free-wheel independently of any rotation of the driveshaft. While the clutch is engaged, motive forces provided by the motor 470 are directed through the transmission 460, if any, and then by the driveshaft 474, whereby the motive forces may be passed through the clutch mechanism 500 to cause the rotation of the hub assembly upon which the wheel is mounted, thereby driving the wheel. While the clutch 500 is disengaged, the wheel and hub assembly may spin freely, independent of the driveshaft 474 and motor 470, as may be required while the trailer 1' is being towed by a powered vehicle between locations. The clutch mechanism 500 may be of any suitable type for selectively transmitting torque from the motor to the wheel, as is understood by those skilled in the art, and may include friction, centrifugal, diaphragm, positive, hydraulic, electromagnetic, or vacuum clutches, as non-limiting examples.

Figure 12B:
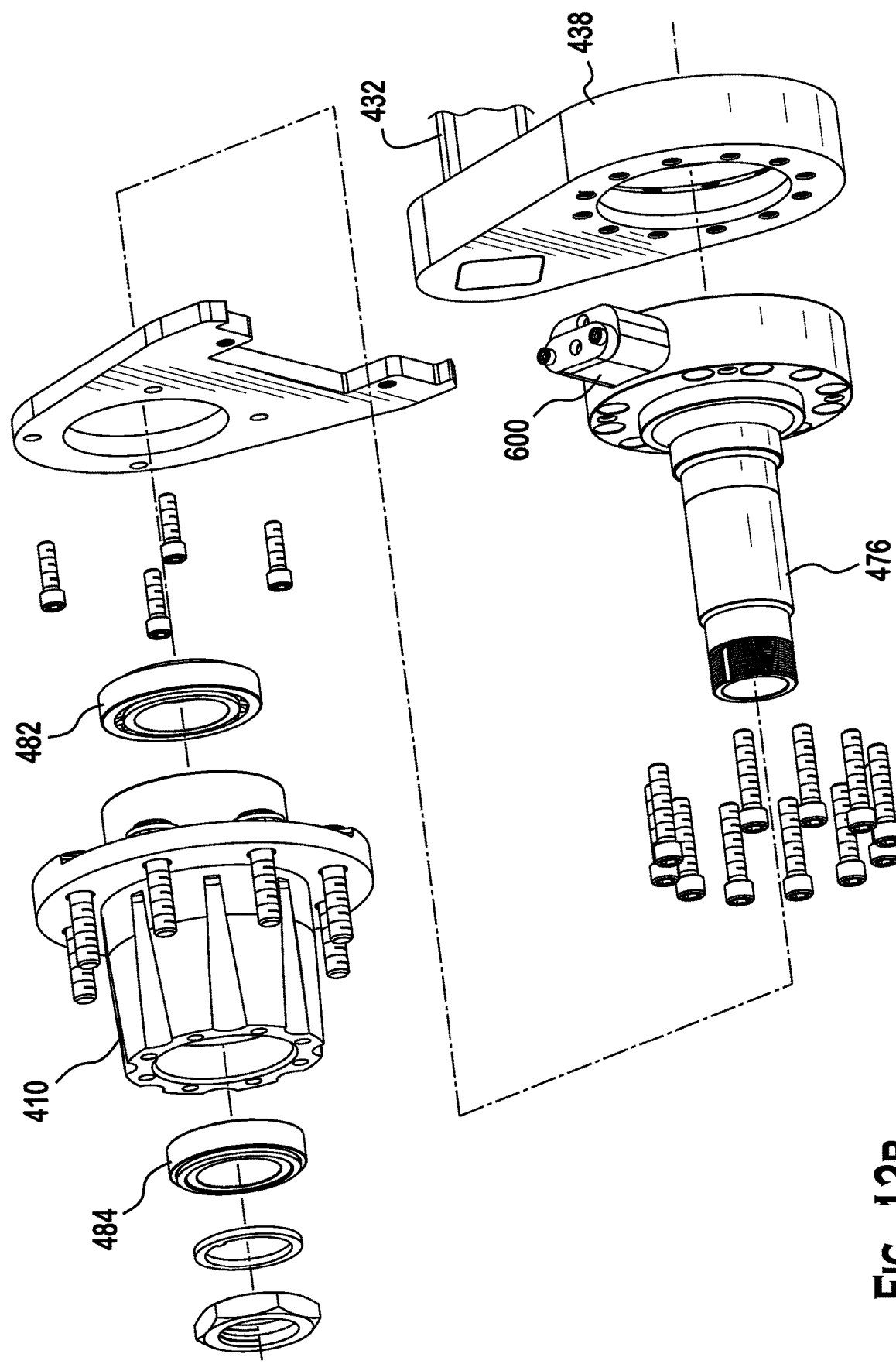
FIG. 12B is a partially exploded view of components of the drive assembly and hub assembly, including a bell housing, hub, and torsion arm.

The clutch assembly may be selectively engaged or disengaged by lateral movement of the flanged driveshaft 474, and each of the wheel hub assemblies may be provided with a locking mechanism 600, which may be any suitable actuation, including manual, electric, hydraulic, or pneumatic operation. The locking mechanism may maintain the clutch assembly in a disengaged state for towing the trailer. In an exemplary embodiment of FIG. 12, the locking mechanism 600 acts to laterally shift the driveshaft 474 and the attached driving clutch element 502 out of engagement with the driven clutch element 504. The locking mechanism may maintain the clutch in a disengaged state, even when the hydraulic system is powered down, as may be convenient for towing the trailer between locations. The locking mechanism may be directed, once at the new site, to allow the re-engagement of the clutch assembly 500, so as to allow the motor to drive the wheel for self-propelling the trailer 1'.

Now with reference to the Figures, the control system 60 will be discussed and generally includes a power system source (i.e. combustion engine, battery) and a control assembly connected (hydraulic and electrical lines) to the rear wheel assembly 310, the front wheel assembly 340, and the extension assembly 380.

Regardless of the specific mode of powering the rear wheels 312, the control system 60 controls starting, stopping and turning the rear wheels 312, as well as for regulating the speed of the rear wheels 312. Likewise, the control system 60 also controls starting, stopping and turning the front wheels 342, as well as for regulating the speed of the front wheels 342.

The control system 60 includes a plurality of controls which may be a series of buttons, levers, or other suitable controls which allow the operator to control expansion and retraction of the front wheel assembly 340 using the extension assembly.

In an embodiment, user controls may be provided on the control system 60 for controlling certain other features of the trailer 1. As shown in the embodiment of FIG. 1, an operator stand may sit in operator's box 62, allowing an operator to move along with the trailer 1 as the operator controls the trailer 1 movement. The control system 60 therefore provides the operator with the ability to control all features of the trailer 1 from a single location, while standing on the operator stand and moving along with the trailer 1 as the trailer 1 travels under its own power.

In a trailing position A, the front wheels 342 are positioned adjacent to the rear wheels 312, while in the self-propelled position B the front wheels 342 are positioned to equally support the undercarriage chassis 20 and, more particularly, the storage bin 80.

According to the invention, the front wheels 342 are positioned between the trailing position A and the self-propelled position B by the extension assembly 380.

Now with reference to FIGS. 1-4, the storage bin 80 generally includes a platform 82, a plurality of retaining walls 84, a tailgate 90, and a pair of cover sections 94.

The platform 82 includes a planar section extending substantially parallel with the frame 10. In the shown embodiment, the platform 82 is a rectangular metal plate. However, one skilled in the art should appreciate that the platform 82 could be manufactured using different shapes and other materials, such as lumber, composite, and other metals. For instance, the platform 82 may include a framed metal structure on which a plurality of wood planks are arranged.

The plurality of retaining walls 84 includes a pair of side retaining walls 86 and a retaining end wall 88. In the shown embodiment, each retaining wall 84 is metal plate. However, one skilled in the art should appreciate that each retaining wall 84 could be manufactured using other materials, such as lumber, composite, and other metals. For instance, each retaining wall 84 may include a framed metal structure on which a plurality of wood planks is disposed along the framed metal structure.

The plurality of retaining walls 84 is positioned and secured along outer edges of the platform 82 and, in particular, along a top planar surface thereof. In the shown embodiment, the pair of side retaining walls 86 are positioned along opposite longitudinal sides of the platform 82, while the retaining end wall 88 is positioned at trailing end of the platform 82. Each retaining wall 84 extends substantially perpendicular with respect to the top planar surface of the platform 82. Each retaining wall 84 is mechanically secured to the platform 82, for instance, using a weld or plurality of known mechanical fasteners. In addition, the retaining end wall 88 is secured to a pair of common ends of the side retaining walls 86. In the embodiment shown, the retaining end wall 88 is mechanically secured to the pair of side retaining walls 86, for instance, using a weld or other known mechanical fasteners or adhesives.

As shown, the tailgate 90 is positioned along a leading end of the platform 82, opposite the retaining end wall 88 positioned along the trailing end thereof. In the embodiment shown, the tailgate 90 is made of a metal. However, one skilled in the art should appreciate that the tailgate 90 could be manufactured using other materials, such as lumber, composite, and other metals. For instance, tailgate 90 may include a framed metal structure on which a plurality of wood planks is disposed along the framed metal structure.

As shown, the tailgate 90 is positioned along an outer edge of the platform 82 and extends substantially perpendicular to the top planar surface thereof. The tailgate 90 is secured to the platform 82, for instance, through a rotating fastener device, such as a rotating hinge 92 positioned at bottom of the tailgate 90 and connecting to the platform 82. The rotating hinge 92 permits rotation of the tailgate 90 from a secured closed vertical position to one in which the tailgate 90 rotates away from the retaining end wall 88 making the platform 82 accessible. However, one skilled in the art should appreciate that other design are possible. For instance, the tailgate 90 may be pivotably mounted to side retaining walls 86 such that the tailgate 90 pivots away from the outer edge of the platform 82 or from the side retaining walls 86, much like known dump trucks.

Each cover section 94 is a rectangular metal structure having a planar surface. Each cover section 94 is positioned along and connected to upper outer edges of the pair of side retaining walls 86 using a plurality of hinges 96. However, one skilled in the art should appreciate that other designs are possible. For instance, other known rotating mechanisms could be used. Each cover section 94 measures approximately half a width as measured between the pair of side retaining walls 86.

A pair of stops 98 are provided and positioned along a common side at opposite ends of the cover section 94. In particular, each stop 98 is disposed along an outer edge of the cover section 94 that is proximate to the side retaining wall 86 when assembled. Each stop 98 is a metal plate having one end secured to the cover section 94. In an exemplary embodiment, the stop 98 is semi-circle shaped having a free end configured to abut the side retaining wall 86 when the cover section 94 rotates about the hinge 96. The stop 98 configuration determines that angle at which the cover section 94 is positioned in an open position. For instance, if the stop 98 has a 135 degree semi-circle shape, then the cover section 94 will be positioned at a 45 degree angle with respect to a plane extending across top surfaces of both side retaining walls 86.

In the shown embodiment, a plurality of wall supports 99 are provided and disposed along outer surfaces of the platform 82, the retaining walls 84, the tailgate 90, and the cover sections 94. The wall supports 99 provide reinforcement for the planar surfaces of each of the outer surfaces. In the shown embodiment, each wall support 89 is a tubular structure of metal that is mechanically secured to the outer surfaces, for instance, using a weld. However, one skilled in the art should appreciate that other known fastening means are possible, including but not limited to screws, nuts and bolts, and adhesives.

Now with references to FIGS. 4-6 and 8, the extension device 100 according to the invention will be described. As shown, the extension device 100 includes the following major components: a first extension section 102, a second extension section 120, and a storage bin platform section 180.

As shown, the first extension section 102 is shown and generally includes a pair of lower supports 104 reciprocally connected to the support beams 12 and a lower lifting actuator assembly 106 connected to the front support 16.

Each lower support 104 is an elongated structural support and, in the shown embodiment, a metal plate. Each lower support 104 includes a plurality of fastener receiving through-holes 108 positioned at a trailing end, leading end, and a middle section thereof. The pair of lower supports 104 are positioned parallel, and are rotatably secured to the frame 10 using fasteners. The lower lifting actuator assembly 106 includes a pair of hydraulic actuators connecting to the front support 16 at one end and to the middle section of the lower support 104 at another end thereof using fasteners.

As shown, the second extension section 120 is shown and includes a boom support 122, a sliding support 124, a sliding mechanism 130, an upper lifting actuator assembly 140, and an articulating arm assembly 150.

The boom support 122 is elongated structural beams and, in the shown embodiment, a tubular metal beam. The boom support 122 includes a pair of fastener receiving brackets 123 with through holes positioned at a trailing end thereof and extending completely there through.

As shown, each sliding support 124 is an elongated structural beams having a boom support receiving passageway 126 opening from a trailing end thereof and extending there through a body of sliding support 124. The boom support receiving passageway 126 is shaped to receive the boom support 122 and, as shown, a cross section area of the boom support receiving passageway 126 is larger than a cross section area of the boom support 122. As a result, a leading end of the boom support 122 is positioned through the boom support receiving passageway 126.

In the shown embodiment, each sliding support 124 is a tubular metal beam. Each sliding support 124 includes a fastener receiving through-hole 128 positioned at a leading end thereof and extending completely there through.

The sliding mechanism 130 is positioned between and connected to the boom support 122 and the boom support receiving passageway 126.

Each sliding mechanism 130 includes an actuator section 132 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

In the shown embodiment, the upper lifting actuator assembly 140 includes a pair of hydraulic actuators 142 is positioned between frame 10 and the second extension section 120. Each hydraulic actuators 142 includes an actuator 174 which may be a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure.

As shown, in an exemplary embodiment of the invention, the articulating arm assembly 150 is a pair of plate like members (see FIG. 8) rotatably connected to the sliding support 124 and the storage bin 180 using the storage bin platform section As shown, the storage bin platform section 180 is shown and generally includes a platform 182, a platform cross member 184, a tilting actuator cross member (not shown), and a pair of bin tilting actuators (not shown).

Now with reference to FIGS. 1, 10, and 11, operation of the trailer 1 or 1' according to the invention will be described.

Building materials can be loaded and secured in the storage bin 80 at a location different than the work site. A truck (not shown) connects to the frame 10 using the trailer hitch 22. The operator positioned the front wheel assembly 340 apart from the rear wheel assembly 310 using the extension assembly 380. The front wheel assembly 340 and the rear wheel assembly 310 are set to drive and steer using the control system 60. The trailer 1 or 1' then can operate as a standard trailer and be towed behind the connected truck to the work site.

The operator then uses the control system 60 to move the trailer 1 or 1' to a desired location on the work site using the drive system of the front wheel assembly 340 and the rear wheel assembly 310, as described above. The operator may now use the control system 60 to stabilize the trailer 1 or 1'.

Once the operator has determined that the trailer 1 is in position to unload building materials from the storage bin 80, the operator can manage the stabilizers (not shown), as known and well understood by those skilled in the art, to stabilize and level the trailer 1 or 1'. The operator then uses the control system 60 to control the extension device 100 and position of the storage bin 80.

The operator can use the control system 60 to control the vertical and horizontal position of the storage bin 80. In addition, the operator can slide the storage bin 80 horizontally with respect to frame 10.

The foregoing illustrates some of the possibilities for practicing the invention. Many other embodiments and fields of use for the trailer 1 or 1' are possible and within the scope and spirit of the invention. It is, therefore, intended that the foregoing description be regarded as illustrative rather than limiting.

What is claimed is:

1. A trailer for towing by a power vehicle, comprising:
   a frame forming an undercarriage chassis;
   a tandem wheel assembly positioned under the undercarriage chassis and having a rear wheel assembly including a rear wheel assembly frame, a rear steering assembly and first and second rear hub assemblies, a front wheel assembly including a front wheel assembly frame, a front steering assembly and first and second front hub assemblies wherein the first and second rear hub assemblies of the rear wheel assembly and the first and second front hub assemblies of the front wheel assembly each provide at least one of a drive assembly, suspension assembly, and brake assembly wherein each suspension assembly is a torsion suspension system; and
   an extension assembly moving the front wheel assembly between trailing position and a self-propelled position where the rear wheel assembly and the front wheel assembly are positioned to equally support the undercarriage chassis.

2. The trailer of claim 1, wherein the rear steering assembly comprises a rear steering arm affixed at a first end to a rear steering bracket on the rear wheel assembly frame, and at a second end to a steering arm mount of a first rear hub assembly.

3. The trailer of claim 2, wherein the first rear hub assembly is mechanically connected to a second rear hub assembly by a rear tie rod extended between the first and second rear hub assemblies, such that the first and second rear hub assemblies are configured to remain substantially parallel as the first rear hub assembly is turned.

4. The trailer of claim 3, wherein the rear tie rod has a ball joint at each end.

5. The trailer of claim 1, wherein the front steering assembly comprises a front steering arm affixed at a first end to a front steering bracket on the front wheel assembly frame, and at a second end to a steering arm mount of a first front hub assembly.

6. The trailer of claim 5, wherein the first front hub assembly is mechanically connected to a second front hub assembly by a front tie rod extended between the first and second front hub assemblies, such that the first and second front hub assemblies are configured to remain substantially parallel as the first hub assembly is turned.

7. The trailer of claim 6, wherein the front tie rod has a ball joint at each end.

8. The trailer of claim 1, wherein the frame includes a plurality of support beams positioned and secured apart by a plurality of connecting beams, a front support, a rear support.

9. The trailer of claim 8, wherein the front support includes a trailer connection section with a trailer hitch positioned on a leading end of the frame.

10. The trailer of claim 8, wherein each support beam of the plurality of support beams includes a support rail.

11. The trailer of claim 10, wherein the support rail is positioned on a lower end of the support beam and running along a length thereof.

12. The trailer of claim 11, wherein the torsion suspension system includes an exterior housing pivotably affixed to the respective wheel assembly frame, a torsion rod contained within the exterior housing, and at least one resiliently deformable element suspending the torsion rod within the exterior housing, and a torsion arm extended between the torsion rod and the hub assembly.

13. The trailer of claim 10, further comprising a storage bin and an extension device connected to the frame and the storage bin to move the storage bin away from the frame.

14. The trailer of claim 13, wherein the storage bin includes a platform extending substantially parallel with the frame.

15. The trailer of claim 14, wherein the extension device includes a first extension section rotatably connected to the frame and a second extension section rotatably connected to the first extension section, and a storage bin platform section connected to the second extension section.

16. The trailer of claim 15, wherein the second extension section is expandable and includes a boom support, a sliding support received by the boom support, a sliding mechanism moving the sliding support relative to the boom support.

17. The trailer of claim 16, wherein the second extension section further includes an upper lifting actuator assembly connected to the frame and the boom support to extend and move the boom support relative to the frame.

18. A trailer for towing by a power vehicle, comprising:
    a frame forming an undercarriage chassis wherein the frame includes a plurality of support beams positioned and secured apart by a plurality of connecting beams, a front support, a rear support, wherein each support beam of the plurality of support beams includes a support rail; a tandem wheel assembly positioned under the undercarriage chassis and having a rear wheel assembly including a rear wheel assembly frame, a rear steering assembly and first and second rear hub assemblies, a front wheel assembly including a front wheel assembly frame, a front steering assembly and first and second front hub assemblies wherein the front wheel frame includes a body with a pair of low friction guides positioned at opposite side ends thereof and corresponding to a support rail of each of a plurality of support beams, and an extension assembly moving the front wheel assembly between trailing position and a self-propelled position where the rear wheel assembly and the front wheel assembly are positioned to equally support the undercarriage chassis.

19. The trailer of claim 18, wherein each low friction guide of the pair of low friction guides is a u-shaped member includes low frictions pads to provide a low friction coefficient between the front wheel frame and the support rail.

* * * * *